United States Patent
Feng et al.

(10) Patent No.: US 12,430,767 B2
(45) Date of Patent: *Sep. 30, 2025

(54) SYSTEMS, METHODS, AND APPARATUSES FOR IMPLEMENTING CONTRASTIVE LEARNING VIA RECONSTRUCTION WITHIN A SELF-SUPERVISED LEARNING FRAMEWORK

(71) Applicant: Arizona Board of Regents on behalf of Arizona State University, Scottsdale, AZ (US)

(72) Inventors: Ruibin Feng, Scottsdale, AZ (US); Zongwei Zhou, Tempe, AZ (US); Jianming Liang, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 380 days.

This patent is subject to a terminal disclaimer.

(21) Appl. No.: 17/497,528

(22) Filed: Oct. 8, 2021

(65) Prior Publication Data
US 2022/0114733 A1  Apr. 14, 2022

Related U.S. Application Data

(60) Provisional application No. 63/222,331, filed on Jul. 15, 2021, provisional application No. 63/089,455, filed on Oct. 8, 2020.

(51) Int. Cl.
*G06T 7/11*    (2017.01)
*G06N 3/088*   (2023.01)
*G06T 7/00*    (2017.01)

(52) U.S. Cl.
CPC ............... *G06T 7/11* (2017.01); *G06N 3/088* (2013.01); *G06T 7/0012* (2013.01);
(Continued)

(58) Field of Classification Search
None
See application file for complete search history.

(56) References Cited

PUBLICATIONS

Pathak, Deepak, et al. "Context Encoders: Feature Learning by Inpainting." arXiv.Org, Apr. 25, 2016, https://arxiv.org/abs/1604.07379v2. (Year: 2016).*

(Continued)

*Primary Examiner* — Matthew C Bella
*Assistant Examiner* — Johnny B Duong
(74) *Attorney, Agent, or Firm* — Elliott, Ostrander & Preston, P.C.

(57) ABSTRACT

Described herein are means for implementing contrastive learning via reconstruction within a self-supervised learning framework, in which the trained deep models are then utilized for the processing of medical imaging. For instance, an exemplary system is specially configured for performing a random cropping operation to crop a 3D cube from each of a plurality of medical images received at the system as input; performing a resize operation of the cropped 3D cubes; performing an image reconstruction operation of the resized and cropped 3D cubes to predict the whole image represented by the original medical images received; and generating a reconstructed image which is analyzed for reconstruction loss against the original image representing a known ground truth image to the reconstruction loss function. Other related embodiments are disclosed.

20 Claims, 26 Drawing Sheets

(52) U.S. Cl.
CPC .............. *G06T 2200/04* (2013.01); *G06T 2207/20081* (2013.01); *G06T 2207/20084* (2013.01); *G06T 2207/20132* (2013.01)

(56) References Cited

PUBLICATIONS

Tao, Xing, et al. "Revisiting Rubik's Cube: Self-Supervised Learning with Volume Wise Transformation for 3D Medical Image Segmentation." arXiv.Org, Jul. 17, 2020, https://arxiv.org/abs/2007.08826v1. (Year: 2020).*

Taleb, Aiham, et al. "3D Self-Supervised Methods for Medical Imaging." arXiv.Org, Jun. 6, 2020, https://arxiv.org/abs/2006.03829v3. (Year: 2020).*

Best Practices for Preparing and Augmenting Image Data for Convolutional Neural Networks. May 6, 2019, https://web.archive.org/web/20190506003103/https://machinelearningmastery.com/best-practices-for-preparing-and-augmenting-image-data-for-convolutional-neural-networks/. (Year: 2019).*

Badea, Radu, et al. "A Comparison of Image Resizing Performance for Ubiquitous Software Platforms." 2018 International Symposium on Electronics and Telecommunications (ISETC), 2018, pp. 1-4. IEEE Xplore, https://doi.org/10.1109/ISETC.2018.8583860. (Year: 2018).*

Abrevaya, Victoria Fernandez, et al. "Cross-Modal Deep Face Normals with Deactivable Skip Connections." arXiv.Org, Mar. 21, 2020, https://arxiv.org/abs/2003.09691v2. (Year: 2020).*

Feng, R., Zhou, Z., Gotway, M.B., Liang, J. (2020). Parts2Whole: Self-supervised Contrastive Learning via Reconstruction. In: Albarqouni, S., et al.DART DCL 2020 2020. Lecture Notes in Computer Science(), vol. 12444. Springer, Cham. https://doi.org/10.1007/978-3-030-60548-3_9 (Year: 2020).*

Ying, Zhenqiang, and Alan Bovik. "180-degree outpainting from a single image." arXiv preprint arXiv:2001.04568 (2020). (Year: 2020).*

Zhou, Zongwei, et al. "Models genesis: Generic autodidactic models for 3d medical image analysis." Medical Image Computing and Computer Assisted Intervention—MICCAI 2019: 22nd International Conference, Shenzhen, China, Oct. 13-17, 2019. Springer International Publishing, 2019. (Year: 2019).*

Ardila, D. et al., "End-to-end lung cancer screening with three-dimensional deep learning on low-dose chest computed tomography," Nature medicine 25(6), 2019, pp. 954-961.

Armato III, S.G. et al., "The lung image database consortium (lidc) and image database resource initiative (idri): a completed reference database of lung nodules on ct scans," Medical physics 38(2), 2011, pp. 915-931.

Bachman, P. et al., "Learning representations by maximizing mutual information across views," Advances in Neural Information Processing Systems, 2019, pp. 15509-15519.

Bakas, S. et al., "Identifying the best machine learning algorithms for brain tumor segmentation, progression assessment, and overall survival prediction in the brats challenge," arXiv preprint arXiv:1811.02629, 2018.

Bilic, P. et al., "The liver tumor segmentation benchmark (lits)," arXiv preprint arXiv:1901.04056, 2019.

Bishop, C.M., et al., "Neural networks for pattern recognition," Oxford university press, 1995.

Caron, M. et al., "Unsupervised learning of visual features by contrasting cluster assignments," arXiv preprint arXiv:2006.09882, 2020.

Carreira, J. et al., "Quo vadis, action recognition? a new model and the kinetics dataset," Proceedings of the IEEE Conference on Computer Vision and Pattern Recognition, 2017, pp. 6299-6308.

Chen, S. et al., "Med3d: Transfer learning for 3d medical image analysis," arXiv preprint arXiv:1904.00625, 2019.

Chen, T. et al., "A simple framework for contrastive learning of visual representations," arXiv preprint arXiv:2002.05709, 2020.

Dosovitskiy, A. et al., "Discriminative unsupervised feature learning with convolutional neural networks," Advances in neural information processing systems, 2014, pp. 766-774.

Gibson, E. et al., "Niftynet: a deep-learning platform for medical imaging," Computer methods and programs in biomedicine, 158, 2018, pp. 113-122.

He, K. et al., "Momentum contrast for unsupervised visual representation learning," arXiv preprint arXiv:1911.05722, 2019.

Misra, I. et al., "Self-supervised learning of pretext-invariant representations," arXiv preprint arXiv:1912.01991, 2019.

Ronneberger, O. et al., "U-net: Convolutional networks for biomedical image segmentation." International Conference on Medical image computing and computer-assisted intervention, 2015, pp. 234-241.

Setio, A.A.A. et al., "Validation, comparison, and combination of algorithms for automatic detection of pulmonary nodules in computed tomography images: the luna16 challenge," Medical image analysis 42, 2017, pp. 1-13.

Tajbakhsh, N. et al., "Computer-aided pulmonary embolism detection using a novel vessel-aligned multi-planar image representation and convolutional neural networks," International Conference on Medical Image Computing and Computer-Assisted Intervention, 2015, pp. 62-69.

Tao, X. et al., "Revisiting rubik's cube: Selfsupervised learning with volume-wise transformation for 3d medical image segmentation," arXiv preprint arXiv:2007.08826, 2020.

Wu, Z. et al., "Unsupervised feature learning via nonparametric instance discrimination," Proceedings of the IEEE Conference on Computer Vision and Pattern Recognition, 2018, pp. 3733-3742.

Zhou, Z. et al., "Models genesis: Generic autodidactic models for 3d medical image analysis," International Conference on Medical Image Computing and Computer-Assisted Intervention, 2019, pp. 384-393.

* cited by examiner

Table 1

| Approach | NCC AUC(%) | NCS IoU(%) | LCS†† IoU(%) | ECC AUC(%) | BMS†† IoU(%) |
|---|---|---|---|---|---|
| Scratch | 94.25±5.07 | 74.05±1.97 | 77.82±3.87 | 79.99±8.06 | 63.91±1.41 |
| I3D | 98.26±0.27 | 71.58±0.55 | 70.65±4.26 | 80.55±1.11 | 67.83±0.75 |
| NiftyNet | 94.14±4.57 | 52.98±2.05 | 83.23±1.05 | 77.33±8.05 | 60.78±1.60 |
| MedicalNet | 95.80±0.49 | 75.68±0.32 | 85.52±0.58 | 86.43±1.44 | 66.09±1.35 |
| Models Genesis | 97.90±0.57 | 77.62±0.64 | 84.17±1.93 | 87.20±2.87 | 68.08±1.15 |
| Parts2Whole | 95.67±0.23 | 77.35±0.61 | 86.70±0.62 | 86.11±2.57 | 68.33±0.41 |
| p-value† | 0.0011 | 0.1709 | 0.0002 | 0.2126 | 0.2654 |

FIG. 4

(a) t-SNE embedding of random (left), Models Genesis (middle), and Parts2Whole (right) features.

TABLE 2:

| Setting | $[\frac{1}{16}, 1]$ w/ s.c.† | $[\frac{1}{16}, 1]$ | $[\frac{1}{16}, 2]$ | $[\frac{1}{16}, 4]$ | $[\frac{1}{16}, 8]$ | $[\frac{1}{32}, 16]$ |
|---|---|---|---|---|---|---|
| NCC | 88.48∓8.24 | 93.78∓2.12 | 91.48∓0.45 | 94.84∓1.58 | 93.52∓1.32 | 91.60∓4.12 |
| NCS | 70.64±0.21†† | 72.72±0.42 | 73.29±0.58 | 74.23±0.87 | 73.43±0.32 | 73.66±0.30 |

FIG. 6C

Parts2Whole — Methodology

<u>Definition</u>

The *universal and intrinsic*
Part-Whole Relationship

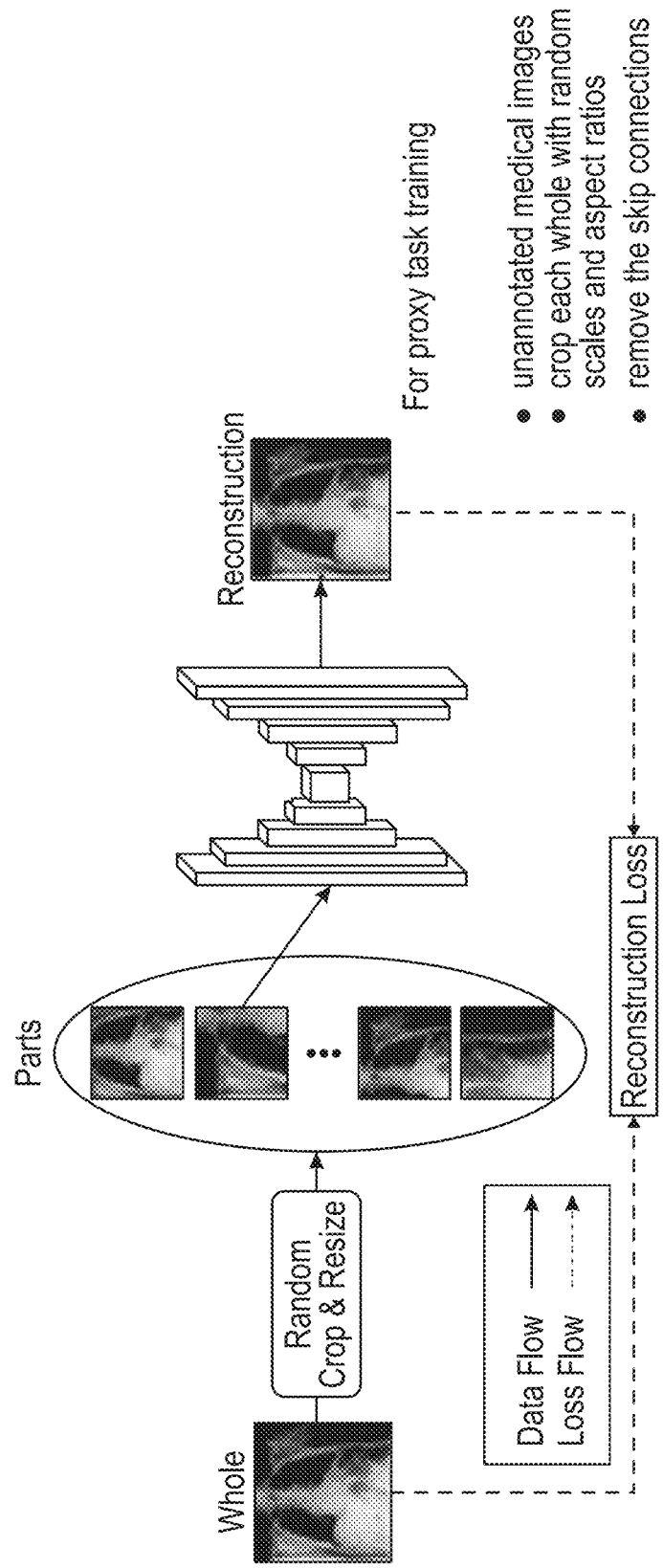

Parts2Whole - Experiment

Parts2Whole - offers significant better or competitive performances.

- *four* publicly available 3D pretrained models
  1. I3D — Supervised with natural videos
  2. NiftyNet ⎫
  3. MedicalNet ⎬ — Supervised with 3D medical images
  4. Models Genesis — Self-supervised with 3D medical images

- *five* target tasks
  1. NCC — Lung nodule false positive reduction (CT) ⎫ Classification
  2. ECC — PE false positive reduction (CT) ⎭
  3. NCS — Lung nodule segmentation (CT) ⎫
  4. LCS — Liver segmentation (CT) ⎬ Segmentation
  5. BMS — Brain tumor segmentation (MRI) ⎭

FIG. 11B

Parts2Whole - Experiment

Parts2Whole offers significant better or competitive performances.

| Method / Task | Modality | Metric | Scratch | I3D | NiftyNet | MedicalNet | Models Genesis | Parts2Whole | p-value+ |
|---|---|---|---|---|---|---|---|---|---|
| NCC | CT | AUC | 94.25±5.07 | 98.26±0.27 | 94.14±4.57 | 95.80±0.49 | 97.90±0.57 | 98.67±0.23 | 0.0011 |
| NCS | CT | IoU | 74.05±1.97 | 71.58±0.55 | 52.98±2.05 | 75.68±0.32 | 77.62±0.64 | 77.35±0.61 | 0.1709 |
| LCS | CT | IoU | 77.82±3.87 | 70.65±4.26 | 83.23±1.05 | 85.52±0.58 | 84.17±1.93 | 86.70±0.62 | 0.0002 |
| ECC | CT | AUC | 79.99±8.06 | 80.55±1.11 | 77.33±8.05 | 86.43±1.44 | 87.20±2.87 | 86.14±2.97 | 0.2126 |
| BMS | MRI | IoU | 63.91±1.41 | 67.83±0.75 | 60.78±1.60 | 66.09±1.35 | 68.08±1.15 | 68.33±0.41 | 0.2654 |

1. The best methods are bolded while the others are highlighted in red if they achieve equivalent performance compared with the best one (i.e., p>0.05).
2. *p-value+* is calculated between vanilla Parts2Whole and the previous top-1 solution.

FIG. 11C

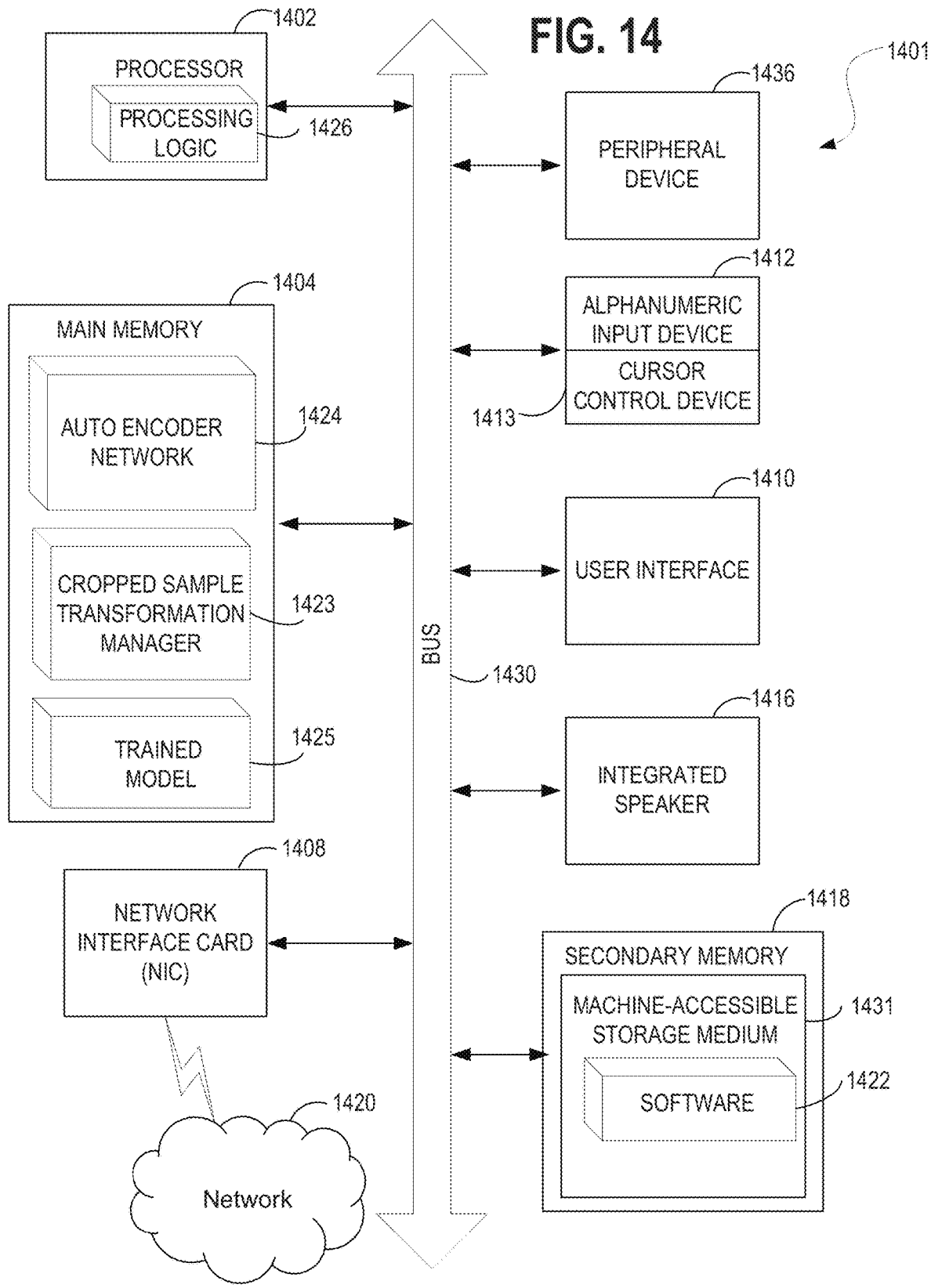

SYSTEMS, METHODS, AND APPARATUSES FOR IMPLEMENTING CONTRASTIVE LEARNING VIA RECONSTRUCTION WITHIN A SELF-SUPERVISED LEARNING FRAMEWORK

CLAIM OF PRIORITY

This non-provisional U.S. Utility patent application is related to, and claims priority to the U.S. Provisional Patent Application No. 63/089,455, entitled "SYSTEMS, METHODS, AND APPARATUSES FOR IMPLEMENTING CONTRASTIVE LEARNING VIA RECONSTRUCTION WITHIN A SELF-SUPERVISED LEARNING FRAMEWORK," filed Oct. 8, 2020, and is further related to, and claims priority to, the U.S. Provisional Patent Application No. 63/222,331, entitled "SYSTEMS, METHODS, AND APPARATUSES FOR IMPLEMENTING CONTRASTIVE LEARNING VIA RECONSTRUCTION WITHIN A SELF-SUPERVISED LEARNING FRAMEWORK," filed Jul. 15, 2021, the entire contents of each being incorporated herein by reference as though each were set forth in full.

GOVERNMENT RIGHTS AND GOVERNMENT AGENCY SUPPORT NOTICE

This invention was made with government support under R01 HL128785 awarded by the National Institutes of Health. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of medical imaging and analysis using convolutional neural networks for the classification and segmentation of medical images, and more particularly, to systems, methods, and apparatuses for implementing contrastive learning via reconstruction within a self-supervised learning framework, in which trained deep models are then utilized for the processing of medical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

Heretofore, self-supervised learning has been sparsely applied in the field of medical imaging. Nevertheless, there is a massive need to provide automated analysis to medical imaging with a high degree of accuracy so as to improve diagnosis capabilities, control medical costs, and to reduce workload burdens placed upon medical professionals.

Not only is annotating medical images tedious and time-consuming, but it also demands costly, specialty-oriented expertise, which is not easily accessible.

Contrastive representation learning achieves the new state of the art in computer vision, but requires huge mini-batch sizes, special network design, or memory banks, making it impractical for 3D medical imaging applications.

To address this challenge, a self-supervised learning framework is newly introduced herein and described in greater detail below, which is configured to build contrastive representations within an image reconstruction framework, effectively addressing the aforementioned barriers to 3D contrastive learning.

The newly introduced self-supervised learning framework as introduced herein may be referred to as a "Parts2Whole" or "Parts2Whole framework," as the methodology directly exploits the universal and intrinsic part-whole relationship. The Parts2Whole framework has been extensively evaluated on five distinct medical tasks and compared four competing publicly available 3D pre-trained models. The experimental results demonstrate that the Parts2Whole framework as described herein significantly outperforms in two out of five tasks while achieves competitive performance on the rest three. Further empirical analysis detailed below further suggests that such superior performance is attributed to the contrastive representations learned within the newly described Parts2Whole framework.

Medical images are naturally associated with rich semantics about the human anatomy, reflected in an abundance of recurring anatomical patterns, offering unique potential to foster deep semantic representation learning and yield semantically more powerful models for different medical applications. But conventional methodologies have been relegated to the 2D space given the complexity and computational barriers to processing 3D medical imagery.

How exactly such strong yet free semantics embedded in medical images can be harnessed for self-supervised learning remains largely unexplored. To this end, self-supervised learning framework described, as implemented via the Parts2Whole framework overcomes these barriers and thus brings greater efficiency and computational feasibility to processing 3D medical images that heretofore was not practical.

Problematically, annotating medical imaging is tedious and time-consuming, and demands costly, specialty-oriented knowledge and skills, which are not easily accessible. Furthermore, any misdiagnosis from failure to recognize or correctly identify anatomical structures and abnormalities may result in potentially devastating impacts on patient morbidity and mortality.

Embodiments described herein therefore provide enhanced solutions to improve upon conventionally known medical image processing and learning techniques by leveraging contrastive representation learning via the self-supervised learning framework in which a deep model is trained to reconstruct a whole from its parts, thus compelling the deep model to learn contrastive representations embedded with part-whole semantics.

The present state of the art may therefore benefit from the systems, methods, and apparatuses for training a deep model to learn contrastive representations embedded within part-whole semantics via a self-supervised learning framework, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 4 depicts Table 1 which describes results demonstrating that the pre-trained model achieves significantly better or at least comparable performance on five distinct medical target tasks over four publicly available 3D models pre-trained in both a supervised and a self-supervised fashion, according to described embodiments;

FIG. 6C depicts Table 2 which shows the target task performance on source models pre-trained on different proxy task settings, according to described embodiments;

FIGS. 10A, 10B, 10C, and 10D depict an exemplary implementation and additional detail of the Parts2Whole methodology, in accordance with described embodiments;

FIGS. 11A, 11B, and 11C depict additional supporting experimental detail for the Parts2Whole methodology, specifically demonstrating significantly better or competitive results, in accordance with described embodiments;

FIG. 14 illustrates a diagrammatic representation of a machine in the exemplary form of a computer system, in accordance with one embodiment.

DETAILED DESCRIPTION

Figure 1:
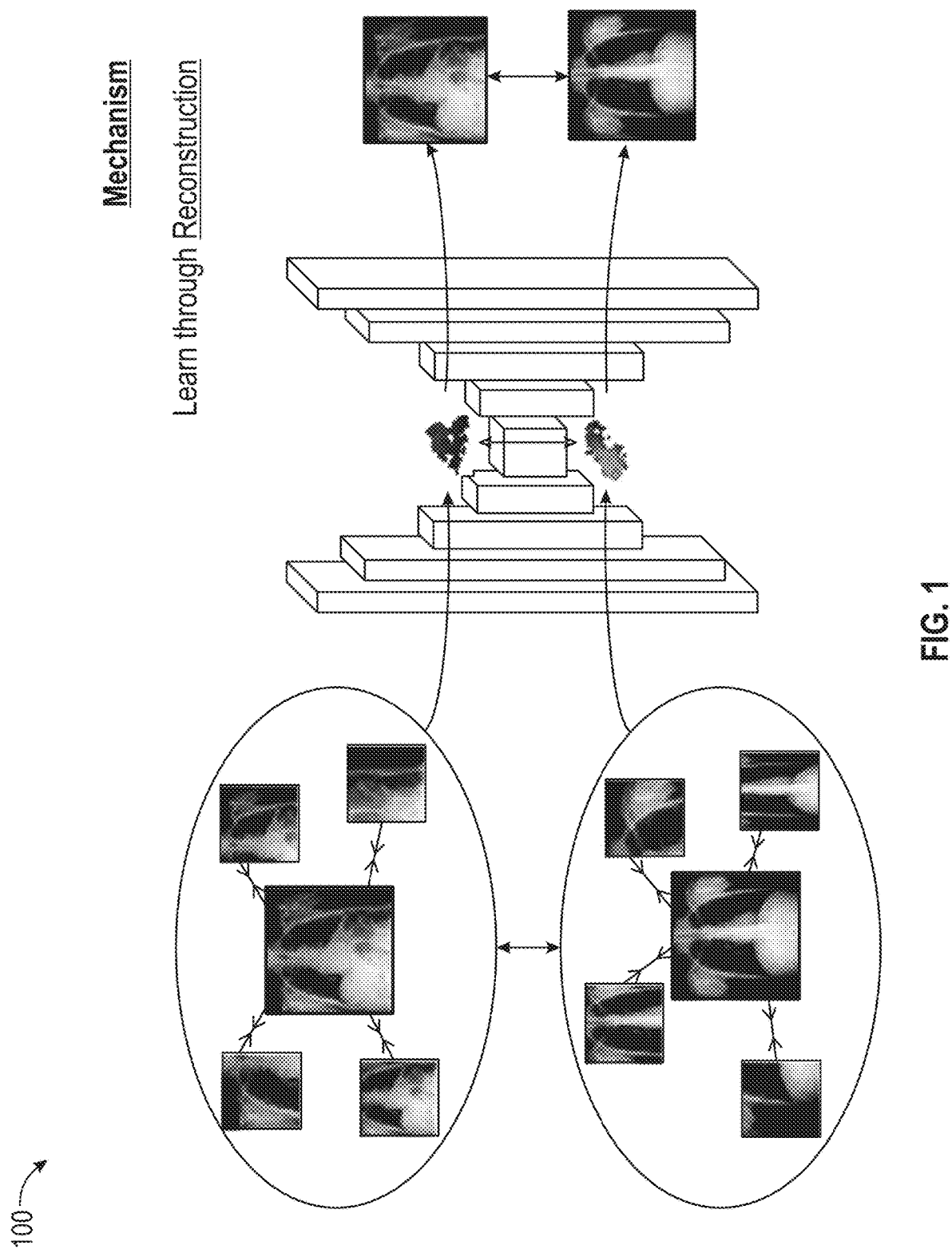
FIG. 1 depicts the use of a disclosed self-supervised learning framework and specifically the mechanism for learning through reconstruction, according to described embodiments.

Described herein are systems, methods, and apparatuses for training a deep model to learn contrastive representations embedded within part-whole semantics via a self-supervised learning framework, in which the trained deep models are then utilized in the context of medical imaging.

Contrastive representation learning has made a leap in computer vision. For example, Techniques such as InsDisc, CMC, and PIRL utilize contrastive losses to significantly boost the performance of Exemplar, Colorization, and Jig-Saw, based image processing, respectively.

The MoCo technique introduces the momentum mechanism, and the SimCLR technique proposes a simple framework for contrastive learning, with both methods achieving state-of-the-art results and even outperforming supervised ImageNet pre-training.

However, contrastive learning requires huge mini-batch sizes, special network design, or a memory bank to store feature representations of all images in the dataset, making contrastive learning techniques impractical for 3D medical imaging applications.

For instance, prior known techniques recommend the use of mini-batch sizes in the thousands, which is infeasible for 3D image data due to practical limitations GPU memory.

Embodiments described herein present solutions which overcome shortcomings with previously known techniques and make contrastive representation learning feasible and efficient for 3D medical imaging. For example, according to certain embodiments, contrastive representations are learned via an image reconstruction framework, leveraging recent advances in 3D representation learning, so as to effectively address the aforementioned barriers associated with contrastive learning in the context 3D medical image processing.

According to a particular embodiment, the described framework exploits a universal and intrinsic property known as the part-whole relationship, in which an entire image is regarded as the whole and any of its patches are considered as its parts.

By reconstructing a whole from its parts, the described framework trains a deep model which is compelled to learn contrastive representations embedded with part-whole semantics. That is to say, the deep model consequently learns (1) the representations of parts belonging to the same whole are close, and additionally learns (2) the representations of parts belonging to different wholes that are far away.

Specifically described embodiments implement a self-supervised learning framework which may be referred to as a Parts2Whole framework. While the described Parts2Whole framework may reconstruct the surrounding contents of a given patch similar to prior known techniques which utilize, for example, out-painting, the described Parts2Whole framework is differentiated in that the deep models trained via the framework learn contrastive representations enriched by part-whole semantics which yields better transferability than prior known techniques.

An exemplary pre-trained model provided by the Parts2Whole framework has been extensively evaluated on five distinct medical target tasks and compared with four competing publicly available 3D models pre-trained in either a fully supervised or a self-supervised fashion.

The statistical analysis provided below at Table 1 demonstrates that the disclosed Parts2Whole framework significantly outperforms prior known techniques in two out of five tasks while achieving competitive performance on the other three, thus providing competitive or significantly better results over all prior known models that were tested.

Furthermore, the Parts2Whole framework was empirically validated and demonstrably shown to be capable of learning contrastive representations within an image reconstruction framework. As will be discussed in greater detail below, the Parts2Whole framework and design is justified by ablating its main components as demonstrated by the results at Table 2. Further discussed is the capability of utilizing the Parts2Whole framework and design for 2D applications.

FIG. 1 depicts the use of a disclosed self-supervised learning framework 100 and specifically the mechanism for learning through reconstruction, according to described embodiments.

Figure 2:
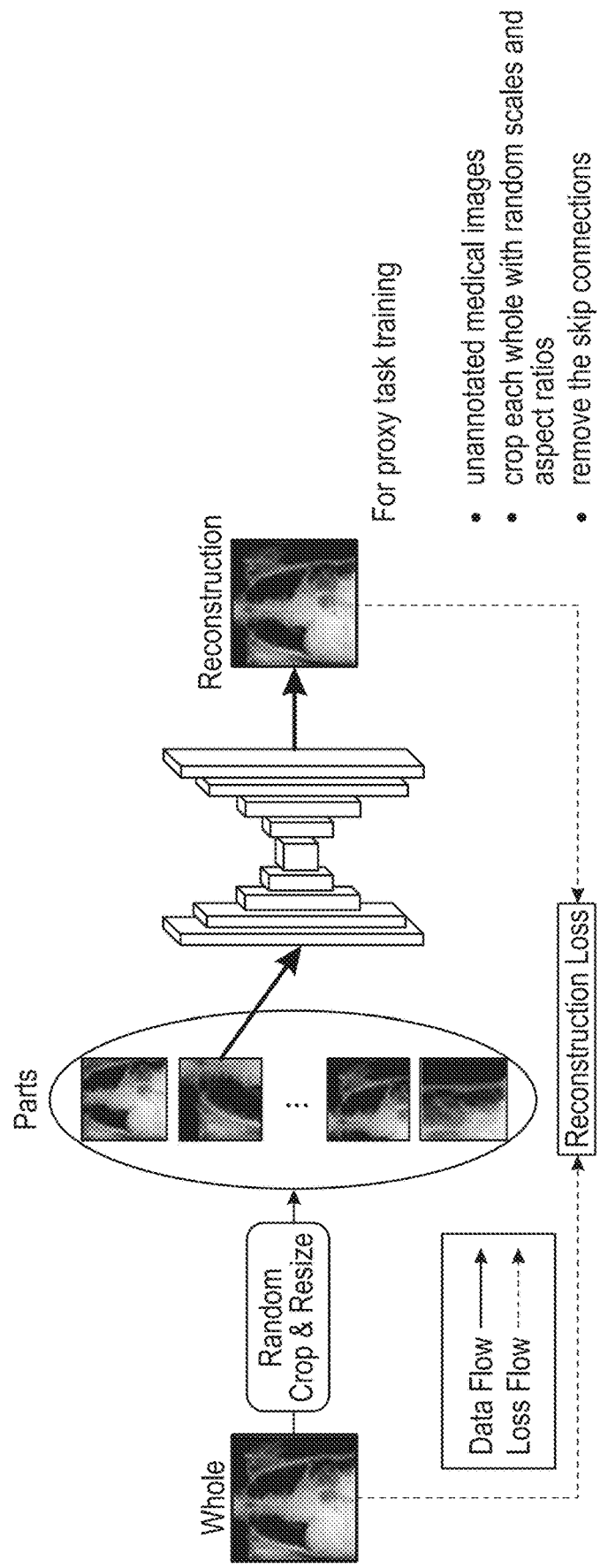
FIG. 2 depicts the use of a disclosed self-supervised learning framework which implements the Parts2Whole framework which learns by reconstructing a whole from its parts, according to described embodiments.

FIG. 2 depicts the use of a disclosed self-supervised learning framework which implements the Parts2Whole framework 200 which learns by reconstructing a whole from its parts, according to described embodiments.

Figure 3:
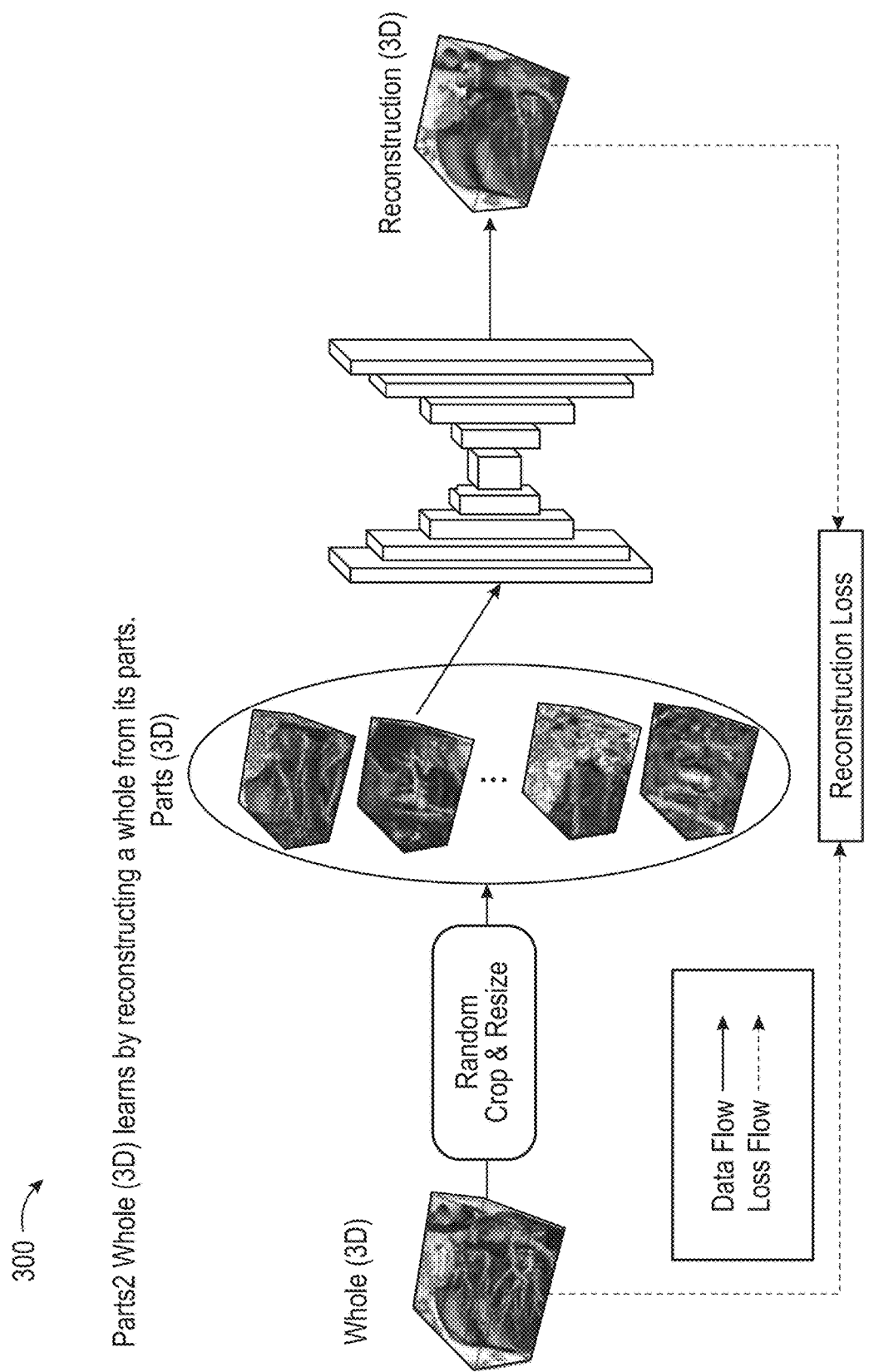
FIG. 3 depicts the use of a disclosed self-supervised learning framework which implements the Parts2Whole (3D) framework which learns by reconstructing a whole (3D) from its parts (3D), according to described embodiments.

FIG. 3 depicts the use of a disclosed self-supervised learning framework which implements the Parts2Whole (3D) framework 300 which learns by reconstructing a whole (3D) from its parts (3D), according to described embodiments.

Collectively, FIGS. 1, 2, and 3 depict the use of disclosed self-supervised learning framework for reconstructing a whole portion cropped and resized from its randomly cropped parts, according to described embodiments.

With reference first to FIG. 1, there is depicted is a new self-supervised learning framework 100, called Parts2Whole, which exploits a universal and intrinsic property, known as the part-whole relationship. Specifically, for the Parts2Whole methodology, an entire image is regarded as the whole and any of its patches are considered as its parts. The Parts2Whole framework described herein learns contrastive representations that are embedded within the part-whole semantics by reconstructing a whole (shown on the left within the framed box) from its randomly cropped parts (shown in the center-left within the framed box).

Thus, in each of the top and bottom ellipses on the left-most portion of FIG. 1, there is a center image which constitutes the "whole" which is then surrounded by four sub-portions of the image which thus represent the "parts."

So as to avoid trivial solutions, each whole is cropped utilizing random scales and random aspect ratios which thus erase low-level cues across different parts while maintaining informative structures and textures.

Further still, according to certain embodiments, skip connections are intentionally not utilized within the Convolutional Neural Network (CNN) so as to avoid low-level details passing from the encoder to the decoder of the CNN, thus yielding generic pre-trained models (e.g., trained deep models) with strong transferability. According to such embodiments, the model is trained in an end-to-end fashion and the reconstruction loss is measured with Euclidean distance.

Figure 5A:
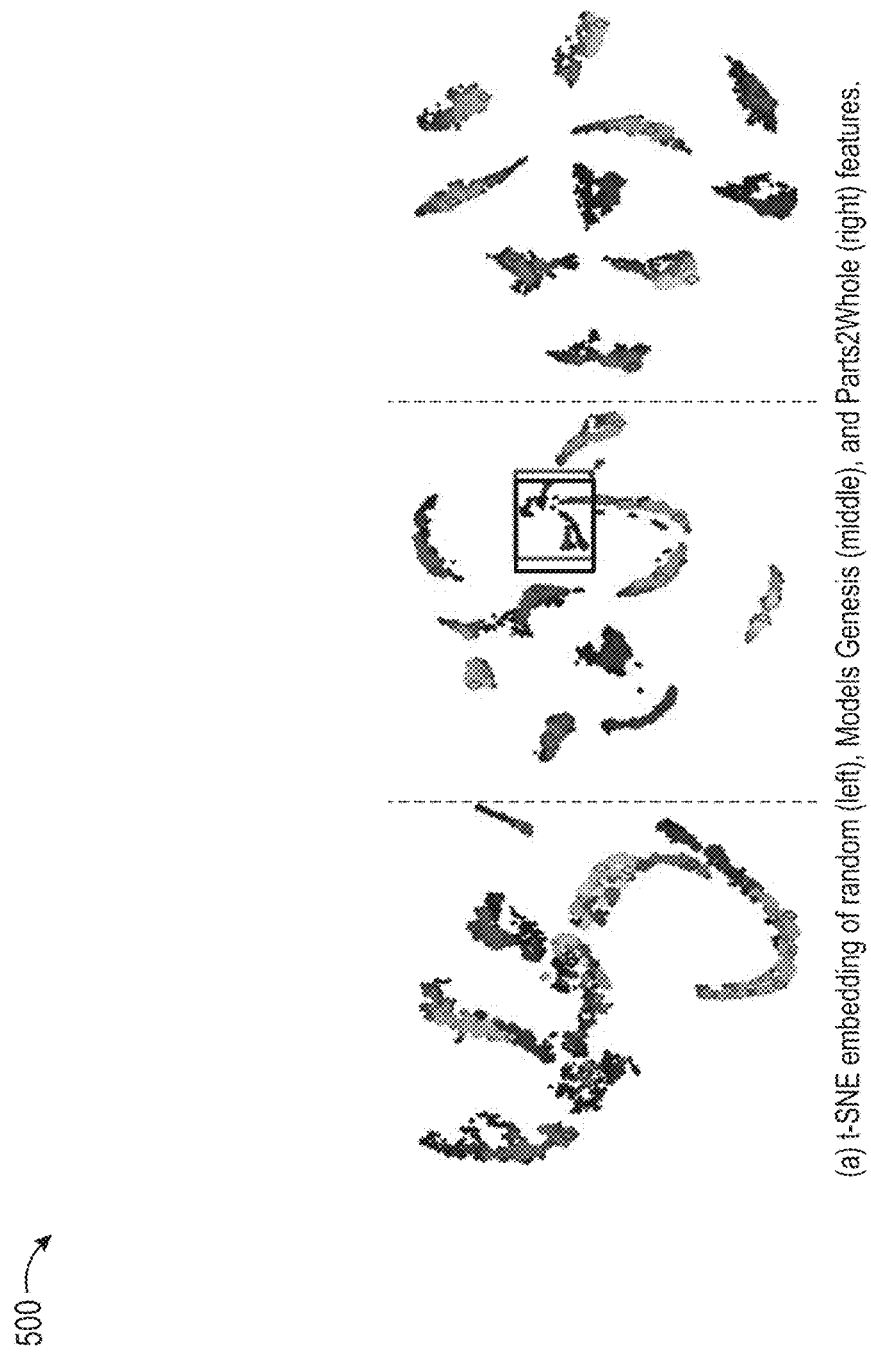
FIGS. 5A, 5B, and 5C depict an architecture having at sub-element (a) visualizations of first t-SNE embeddings of random and Parts2Whole features and at sub-element, and having at sub-element (b) cosine similarity between features of two parts belonging to the same or different images and having at sub-element (c) the contrastive loss is shown to decrease as the reconstruction loss decreases, according to described embodiments.
Figure 5B:
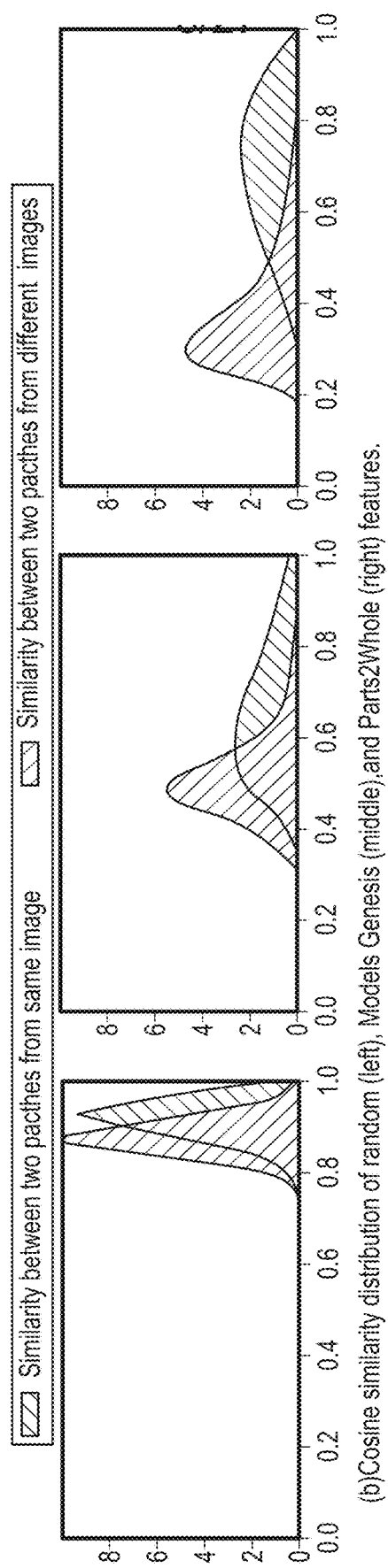
Figure 5C:
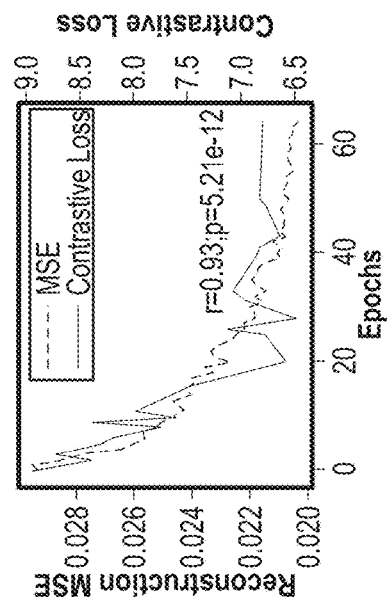

For example, according to a particular embodiment, the self-supervised learning framework learns contrastive representations embedded with part-whole semantics by reconstructing the whole image from its parts. For instance, refer to the additional detail as set forth by FIGS. 5A, 5B, and 5C, in which the self-supervised learning framework learns contrastive representations embedded with part-whole semantics by reconstructing the whole image from its parts as depicted at sub-elements (a), (b), and (c), which are described in greater detail below. Notably, the self-supervised learning framework utilizes unlabeled images, which have no human or manual annotation whatsoever. The proposed self-supervised learning framework as illustrated at FIGS. 5A, 5B, and 5C thus takes an original image, then performs random cropping and resizing, followed by image reconstruction, and lastly generates a reconstructed image which is then analyzed for reconstruction loss against the original image representing a known ground truth image to the reconstruction loss function.

Further detail is provided with reference to FIG. 2, in which it is shown that the Parts2Whole framework 200 methodology learns by reconstructing a "whole" from its "parts." Specifically, it is depicted at the left-most portion of the Figure that a "whole" is subjected to the random crop and resize function resulting in the "parts" depicted in the center ellipse. These parts are then inputted into the model which outputs the reconstruction of the original image as depicted at the right-most portion of FIG. 2. Thus, for proxy task training, the Parts2Whole methodology utilizes annotated medical images, operates to crop each "whole" with random scales and aspect ratios, and utilizes a specially configured model in which the skip connections have been intentionally removed.

With reference next to FIG. 3, it is thus depicted that even with reference to a three-dimensional (3D) input image, a similar process may be followed as was described with regard to the two-dimensional (2D) image at FIG. 2. Notably, the Parts2Whole (3D) framework 300 methodology again subjects the 3D "whole" which is provided as an input to the random crop and resize, resulting in the 3D "parts" which are then process again through the model which has been specially configured so as to remove the skip connections.

Problem formulation: According to a particular embodiment, processing denotes a set of 3D unlabeled images as $\{x_i \in X: i \in [1,N]\}$, where N is the number of whole images. Each image $x_i$ is random cropped and resized to generate various parts, referred to as $\{p_i^j \in P_i: i \in [1,N], j \in [1,M]\}$. The task is to predict the (resized) whole image $x_i$ from its local patch $p_i^j$ by training a pair of encoder ($F_E$) and decoder ($F_D$) to minimize the loss function, denoted by:

$$\mathcal{L} = \Sigma_i \Sigma_j l(\mathcal{F}_D(\mathcal{F}_E(p_i^j)), x_i),$$

where l(•) is a metric measuring the difference between the model outputs and ground truths. Euclidean distance is used as l(•) according to such an embodiment. Since the output images are generated via a shared decoder ($F_D$), the encoder ($F_E$) is forced to learn contrastive representations that embed the part-whole semantics. More particularly, after training, each of $\mathcal{F}_E(p_i^j)$ and $\mathcal{F}_E(p_i^{j'})$ since the two representations are mapped to the same ground truth ($x_i$) via the shared decoder ($F_D$), while far away from each other since they are mapped to different ground truths. To avoid ambiguous cases, it is further assumed that no part is also a whole.

Removing skip connection: The skip connection (or the shortcut connection) which is utilized to connect the encoder and decoder in the U-Net architecture, is purposefully avoided according to certain embodiments. Use of a skip connection, allows the decoder to access the low-level features produced by the encoder layers such that the boundaries in segmentation maps produced by the decoder are ensured to be accurate.

However, if the network can solve the proxy task using lower-level patterns, then the network does not need to learn the semantically meaningful content. Therefore, in proxy task training as described herein, a modified 3D U-Net architecture is utilized in which the skip connection is intentionally removed and absent during training so as to force the bottleneck representations encoding high-level information. A pre-trained decoder is therefore not provided due to the lack of skip connection, thus differentiating the described embodiments from prior known techniques. Nonetheless, the described model offers very competitive performance on three segmentation tasks with a randomly initialized decoder, suggesting the pre-trained encoder learns strong, generic features.

Extracting local yet informative parts: The part size is a configurable feature component of the disclosed proxy task design in accordance with described embodiments. For example, when the cropping scale is too large, the task is downgraded to training an autoencoder without learning semantics. Conversely, the cropping scale is too small, the task may be unsolvable as the parts that are too small simply do not contain enough information. To avoid such degenerate solutions, described embodiments may be restricted to cropped patches covering less than ¼ of the area of the whole image. By doing so, the low-level cues across different parts are largely erased. Additionally, certain embodiments set each part covering more than 1/16 of the area of the original image to have discriminative structures and textures, thus producing the generated parts as illustrated in at FIG. 1.

Experiments and Experiment Settings for Proxy Task Training: The described model was pre-trained on the LUNA-2016 dataset purposefully without using any label provided by the dataset. To avoid test data leakage, 623 CT scans were used instead of all 888 scans. First, original CT scans were cropped into small, non-overlapped 28,144 sub-scans with dimensions equal to 128×128×64. Each generated sub-scan was treated as a whole for the experiment and parts were cropped from it on the fly, resulting in the cropped parts containing [1/16, ¼] volume of the whole image.

Target Task Training: The pre-trained 3D model was then extensively evaluated by investigating five distinct medical applications, including lung nodule false positive reduction (NCC), lung nodule segmentation (NCS), liver segmentation (LCS), pulmonary embolism false positive reduction (ECC), and brain tumor segmentation (BMS).

The Parts2Whole framework yields are competitive to 3D pre-trained models: The Parts2Whole framework was evaluated four publicly available 3D models, each pre-trained in both a supervised and a self-supervised fashion. Specifically, two of the models tested were supervised pre-trained on 3D medical segmentation tasks: NiftyNet with Dense VNet-works and MedicalNet with ResNet-101 as the backbone. The former was pretrained with a multi-organ CT segmentation task, and the latter was pre-trained with an aggregate dataset (e.g., the 3DSeg-8) derived from eight public medical datasets. Further evaluated was I3D, which was pre-trained with natural videos but has been successfully applied for lung cancer classification.

FIG. 4 depicts Table 1 (element 400) which describes results demonstrating that the pre-trained model achieves significantly better or at least comparable performance on five distinct medical target tasks over four publicly available 3D models pre-trained in both a supervised and a self-supervised fashion. Each experiment was conducted for 10 trials and summarized with the mean and standard deviation (mean±s.t.d.). The paired t-test results between the methodology as described herein and the previous top-1 solution are tabulated in terms of the p-value. The best approaches are bolded while the others are highlighted if they achieved equivalent performance compared with the best one (i.e., p>0.05).

In the table above, the "p-values †" are calculated between the described Parts2Whole framework and the previous top-1 solution. The IoU score †† was calculated using binarized masks with a threshold equal to 0.5 to better presented the segmentation quality, while Models Genesis uses the original masks without thresholding. The results ††† shown here are different from those publicly reported because real data was utilized while Models Genesis were evaluated with synthetic data.

For self-supervised learning, state of the art pre-trained Models Genesis for 3D medical imaging were utilized as a baseline. The experimental results are summarized at Table 1 of FIG. 4. from which it may be observed that I3D works well on NCC but performs inferiorly on the other four tasks. This sub-optimal performance may be attributable to the marked difference between natural and medical domains. On the other hand, NiftyNet and MedicalNet, which are fully supervised with medical data, also show relatively poor transferability according to the results. The main reason likely is due to the limited amount of annotation for supervising for those methodologies.

A piece of evidence is that MedicalNet considerably outperforms NiftyNet by aggregating eight datasets for pre-training. These observations highlight the significance of self-supervised learning in the 3D medical domain, which can close the domain gap and utilize the vast amount of un-annotated data. In contrast with fully supervised pre-training, both self-supervised learning methods (e.g., both Models Genesis and the disclosed Parts2Whole framework described herein) achieved promising results on all five-target tasks across organs, diseases, datasets, and modalities. Specifically, for NCC and LCS, the disclosed Parts2Whole framework not only has higher AUC/IoU scores and lower standard deviations but also significantly outperforms Models Genesis based on the t-test (p<0.05).

Conversely, Models Genesis achieves better performance by a small margin on NCS and ECC tasks. On the BMS task (far right column of Table 1 at FIG. 4), which has considerable distance from the proxy dataset (e.g., utilizing different disease, organ, and modality), the disclosed Parts2Whole framework is still competitive compared to other baselines. Furthermore, the disclosed Parts2Whole framework saves about 23% of the proxy task training time compared with Models Genesis (refer to the Appendix for details), suggesting the disclosed Parts2Whole framework is more efficient. Further still, because Models Genesis provides both a pre-trained encoder and decoder, it would be expected to have certain advantages on segmentation tasks such as NCS, LCS, and BMS. Nonetheless, the disclosed Parts2Whole framework yields promising results on all segmentation tasks with the same architecture (e.g., 3D U-Net) and a randomly initialized decoder, suggesting the encoder pre-trained with the disclosed Parts2Whole framework learns features with strong transferability.

Next, we will experimentally investigate the properties of feature representations learned in Parts2Whole.

FIGS. 5A, 5B, and 5C depict an architecture 500 having at sub-element (a) visualizations of first t-SNE embeddings of random and Parts2Whole features and at sub-element, and having at sub-element (b) cosine similarity between features of two parts belonging to the same or different images and having at sub-element (c) the contrastive loss is shown to decrease as the reconstruction loss decreases, according to described embodiments;

The t-SNE embeddings of random and Parts2Whole features were visualized so as to aid in understanding the learned representations as depicted at sub-element (a) of FIG. 5A. Ten images were randomly selected and two-hundred (200) parts were generated from each image.

At sub-element (a) of FIG. 5A, the circles represent the parts while diamonds represent the resized wholes. The different shades and circle sizes denote the different images and crop scales. Unlike the entangled random features, the Parts2Whole features from the same images are well grouped, while features from different images are highly separatable. As further depicted at sub-element (b) of FIG. 5B, the entire validation set was leveraged and the cosine similarity was measured between features of two parts belonging to the same or different images. Notably, the distributions of Parts2Whole features are more separable than those of random features, indicating that Parts2Whole learns better representations.

As further depicted at sub-element (c) of FIG. 5C, the contrastive loss is demonstrated to continue to decrease as the reconstruction loss decreases, validating that the described Parts2Whole framework does indeed learn contrastive representations.

With reference to FIG. 5A, sub-element (a) further depicts experimental results for the Parts2Whole methodology as it learns contrastive features when compared with random features. Notably, as depicted here, the lightest portions of each graph depicts the feature representations of parts belonging to the same whole which are close whereas the darker portions of each graph depicts the feature representations of parts belonging to different wholes which are far away.

With reference to FIG. 5C, sub-element (c) further depicts how the Parts2Whole methodology minimizes reconstruction loss and decreases contrastive loss. More particularly, it is shown here that over multiple epochs (on the horizontal axis) both the reconstruction MSE and the contrastive loss significantly decrease.

Figure 6A:
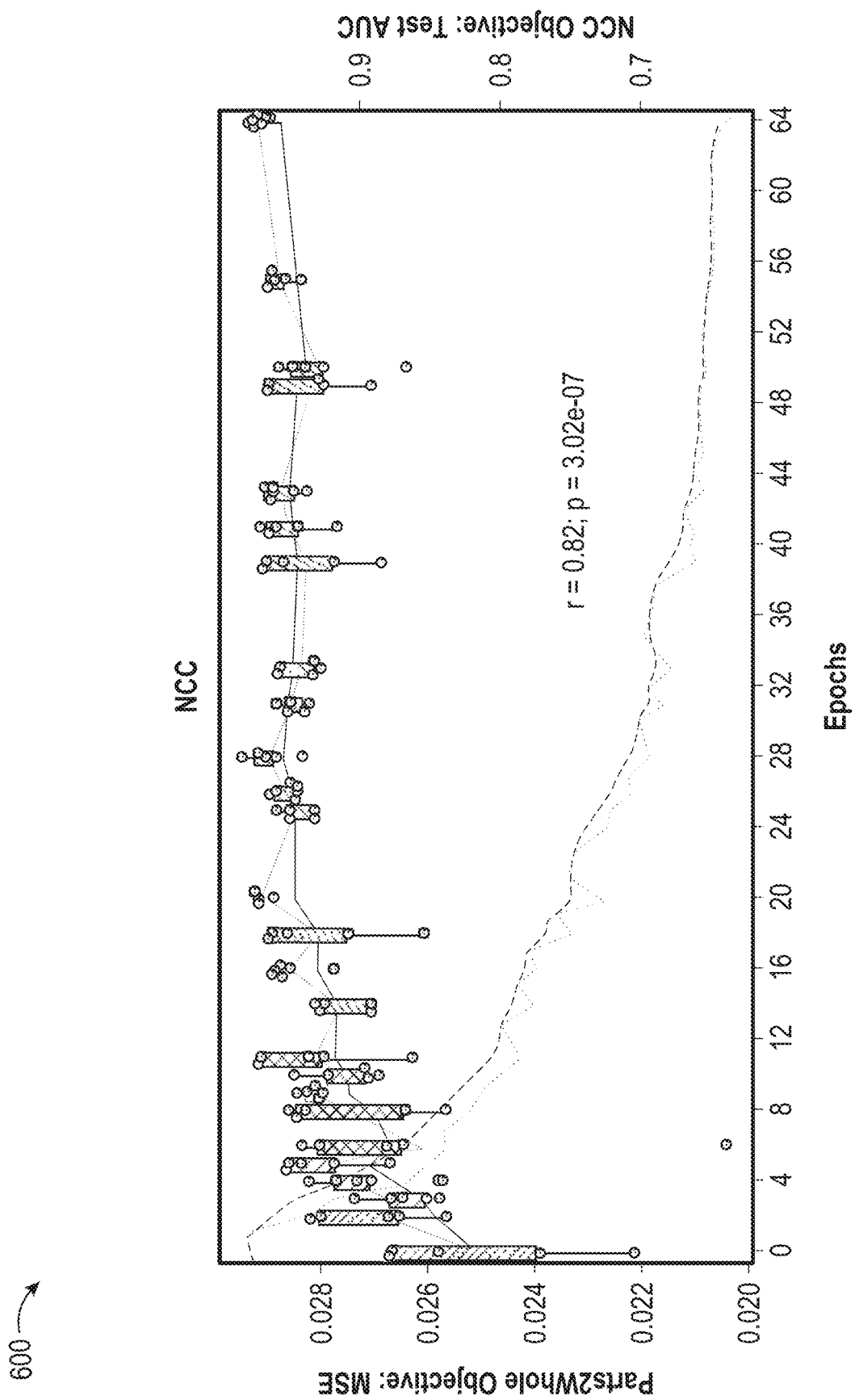
FIGS. 6A and 6B depict how the overall performance of target tasks continues to improve as the validation loss in the proxy task decreases, in accordance with described embodiments.
Figure 6B:
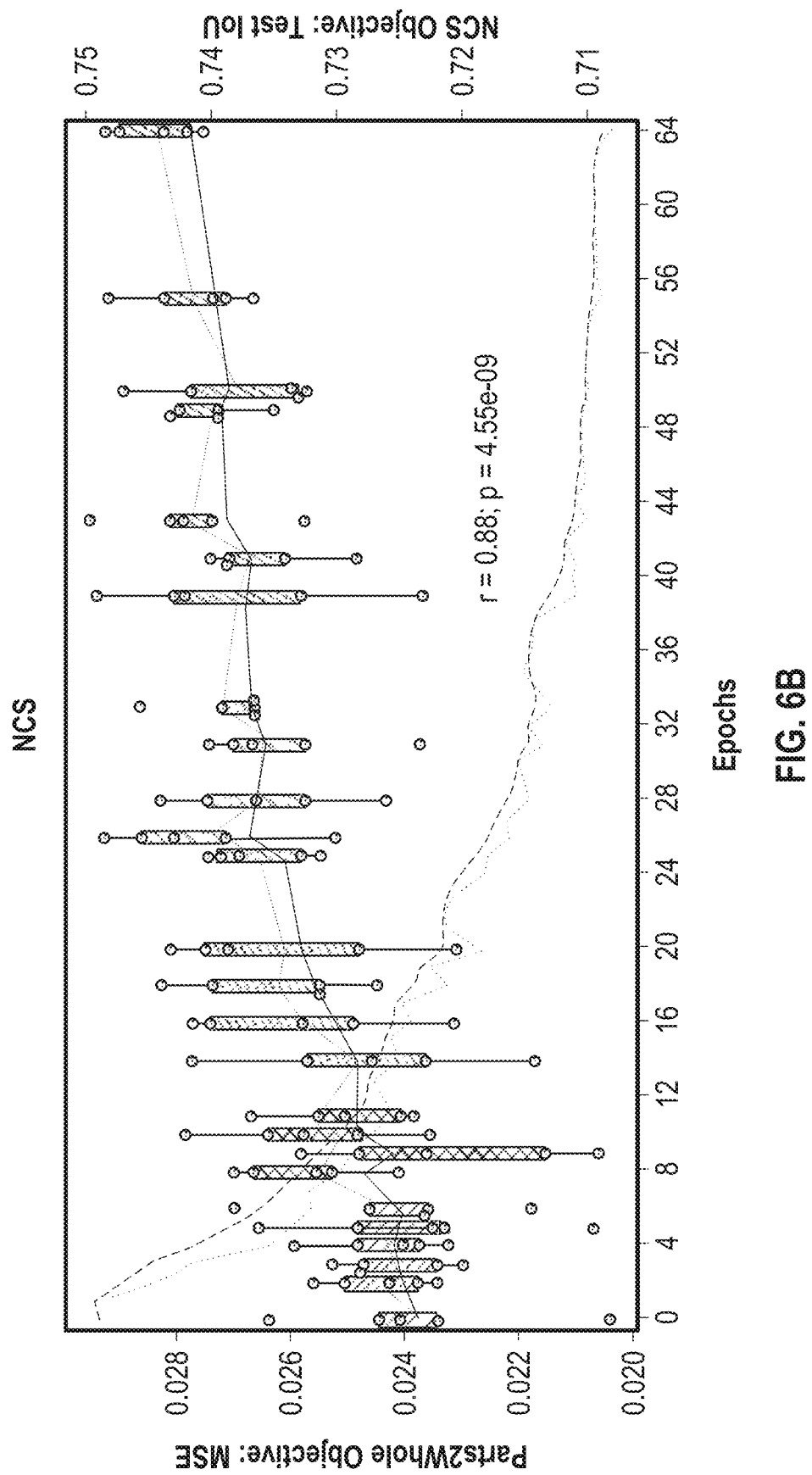

FIGS. 6A and 6B depict how the overall performance of target tasks continues to improve as the validation loss in the proxy task decreases, in accordance with described embodiments.

For instance, the consistency of the proxy and NCC/NCS target objectives are validated by evaluating 26 (twenty-six) checkpoints saved in the proxy training process. It is clear that as the proxy loss decreases, the average AUC/IoU score increases while the standard deviation decreases, suggesting that the pretrained model becomes more generic and robust. Additionally, the Pearson product-moment correlation analysis indicates a strong positive co-relationship between proxy and target objectives (Pearson's r-value>0.5).

The goal of contrastive learning was achieved with small mini-batch sizes (16 instead of 8192), a general 3D U-Net architecture, and without using memory banks, thus effectively addressing the barriers associated with previous contrastive learning methods. However, it is still not clear whether good contrastive features embedded with part-whole semantics can yield strong transferability, since the proxy task is agnostic about the target tasks. To answer this question, the relationship between the reconstruction loss in the proxy task and the test performance in target tasks was systematically investigated, as described in greater detail below.

Parts2Whole's objective is positively correlated with target objectives: A good proxy is able to improve the target task performance consistently as the proxy objective is optimized. Following this practice, the consistency of proxy and task objectives were validated by evaluating 26 checkpoints saved in the proxy training process. Specifically, every checkpoint was fine-tuned 5 times on NCC and NCS target tasks. To reduce the computational cost, only partial training data was used (e.g., 45% and 10% for NCC and NCS respectively) and the proxy reconstruction loss and target scores (AUC/IoU) were plotted as a function of proxy task training epochs as shown at FIG. 6A (depicting NCC) and FIG. 6B (depicting NCS).

Consequently, it may be observed that, as the reconstruction ability in the proxy task improves (i.e., the validation MSE decreases), the transferability of the pretrained model also improves (i.e., the average target score (AUC/IoU) increases while the standard deviation decreases).

The relationship was further investigated by performing Pearson product-moment correlation analysis between the proxy objective (i.e., reconstruction quality, measured by (1-MSE) and target objective (measured by AUC/IoU scores). The high Pearson's r-values (0.82 and 0.88 in NCC and NCS, respectively) suggest a strong positive co-relationship between proxy and target objectives. This analysis indicates that the superior target performance is attributable to the decreasing of reconstruction loss and the learned contrastive features.

FIG. 6C depicts Table 2 (element 602) which shows the target task performance on source models pre-trained on different proxy task settings. First, by removing skip connections (comparing Column 2 to 3), the target performance improves significantly by 5.30 and 2.08 points in NCC and NCS, respectively, suggesting that skip connections provide some shortcuts to solve the proxy task using lower-level details. Further, it may be observed here that by reducing the cropping scale (from Column 3 to 6), the overall performer continuously increases, plateaus at [$\frac{1}{16}$, $\frac{1}{4}$], and appears to saturate when the scale is less than $\frac{1}{8}$. However, when the parts are too small (e.g., [$\frac{1}{32}$, $\frac{1}{16}$]), the score is shown to drop by 3.15 and 0.57 points in NCC and NCS, respectively. These observations indicate the importance of part sizes in the disclosed proxy task design.

At Table 2 of FIG. 6C, the source model is trained with skip connections (s.c.) between the encoder and decoder † and both pre-trained encoder and decoder were fine-tuned on the target task ††.

Ablation Study: A good proxy task needs to be hard but feasible. The Parts2Whole framework and design as described herein thus makes two notable specialized configurations. Specifically, the intentional removal of skip connections and further the selecting proper part sizes. The impacts of the two components were ablated to justify the described proxy task design. Source models pre-trained with different proxy task settings on NCC and NCS target tasks with 45% and 10% training data were evaluated, with the experimental results set forth at Table 2.

The effects of skip connections were first studied as shown at Columns 2 to 3 of Table 2. By removing skip connections while keeping the same cropping scale, the target performance improves significantly by 5.30 and 2.08 points in NCC and NCS, respectively. These results suggest that skip connections may pass lower-level details from the encoder to decoder, and in so doing, provide some shortcuts to solve the proxy task. The same network architecture (i.e., no skip connections) was further studied to determine the effects of different part sizes as shown at Columns 3-7 of Table 2. When the upper bound of part sizes is gradually reduced, the overall performer continuously increases, plateaus at $1/4$, and appears to saturate at $1/8$. Conversely, when the parts are too small (i.e., less than $1/16$), the target performance drops by 3.15 and 0.57 points in NCC and NCS, respectively. These observations indicate the importance of proper part sizes as specially configured for the disclosed proxy task design, in which the parts should be small enough to avoid trivial solutions while large enough to contain enough information to recover the whole images. In other words, the idea that a good proxy task should be hard enough but still feasible is validated by the results shown here.

Parts2Whole 2D offers performance on par with Models Genesis 2D: While the preferred focus is on 3D imaging, the power of the described Parts2Whole framework was further evaluated for 2D applications by utilizing the ChestX-ray14 dataset and compared with Models Genesis 2D. For the evaluation, 14 diseases were classified utilizing the official split, which are different from the DXC task. A 2D model, which may be referred to as Parts2Whole 2D framework, was pre-trained, on the training split. The Parts2Whole 2D framework as described herein achieved 79.95±0.19 AUC scores, providing performance on par with ModelsGenesis 2D (79.82±0.10) with p>0.1. The same hyper-parameters were utilized (e.g., crop scale) as was deployed in the 3D pre-training without any additional tuning. Therefore, it is expected that performance may be further boosted for 2D image processing by selecting hyperparameters which are specifically tailored for 2D image processing.

It is therefore in accordance with the described embodiments that a new self-supervised framework, Parts2Whole, is provided which directly exploits the universal and intrinsic part-whole relationship. The disclosed Parts2Whole framework demonstrably learns contrastive representations in an image reconstruction framework. The experimental results show that the resulting pre-trained model achieves competitive performance over four publicly available pre-trained 3D models on five distinct medical target tasks.

Because only the part-whole relationship was used, incorporating other domain knowledge or transformations are expected to further improve results. For instance, alternative embodiments specifically include color/intensity transformations since the similar intensity distribution across parts from one image may provide shortcuts to solve the proxy task.

Figure 7:
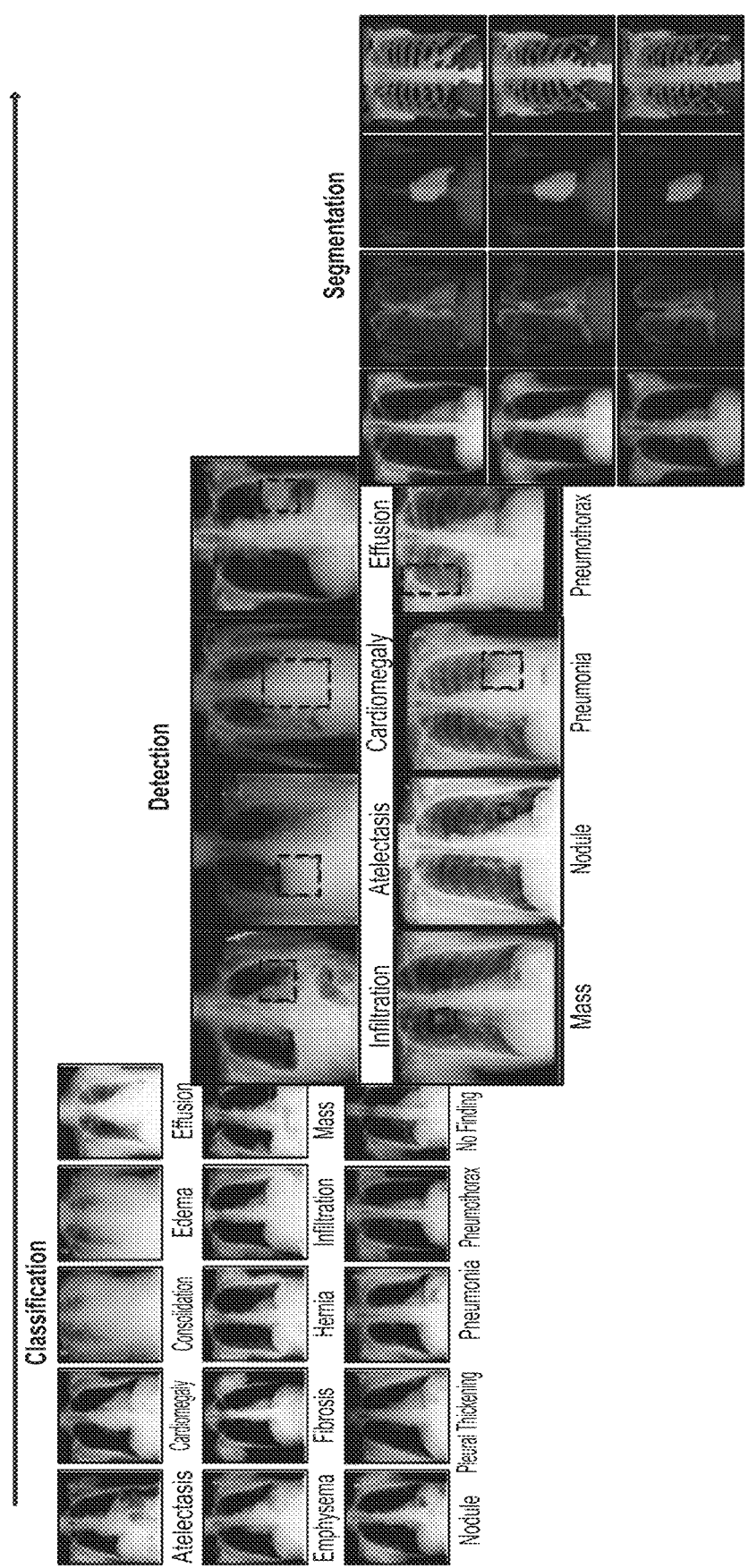
FIG. 7 depicts the problem of annotation starvation amongst various image groups utilized for the purposes of classification, detection, and segmentation.

FIG. 7 depicts the problem of annotation starvation amongst various image groups utilized for the purposes of classification, detection, and segmentation.

A significant challenge in medical imaging analysis is how to acquire huge annotated data since medical imaging is still an annotation starving area, especially for detection and segmentation tasks, which require pixel-level annotations. Use of the described Parts2Whole framework addresses this challenge.

Figure 8A:
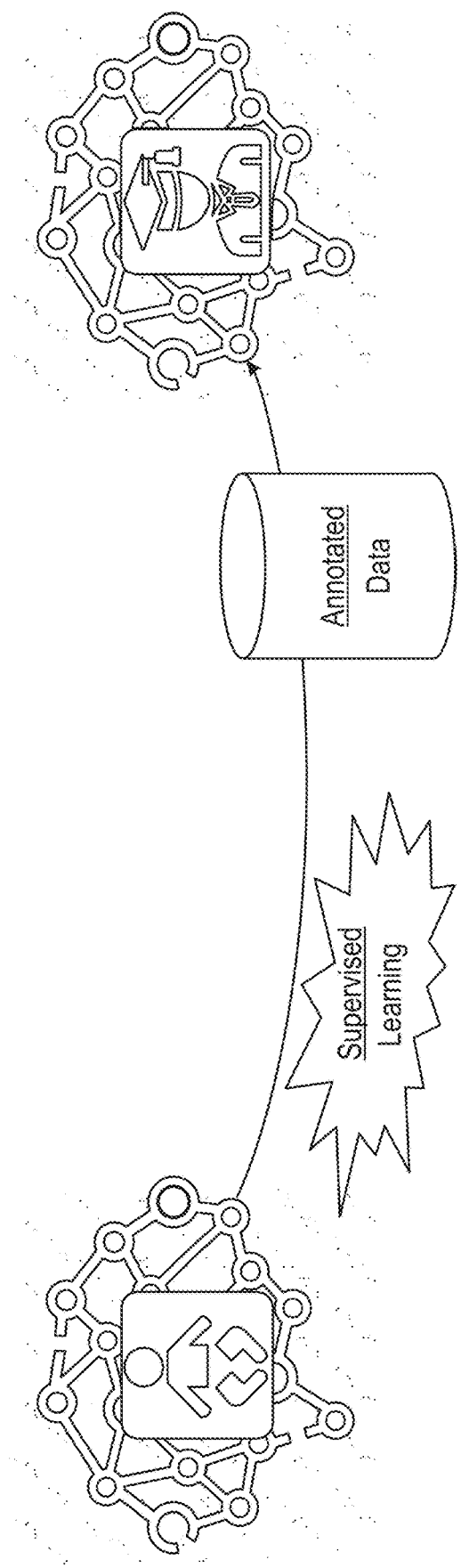
FIGS. 8A and 8B depict how the utilization of self-supervised learning improves upon prior known techniques, such as "supervised learning;"
Figure 8B:
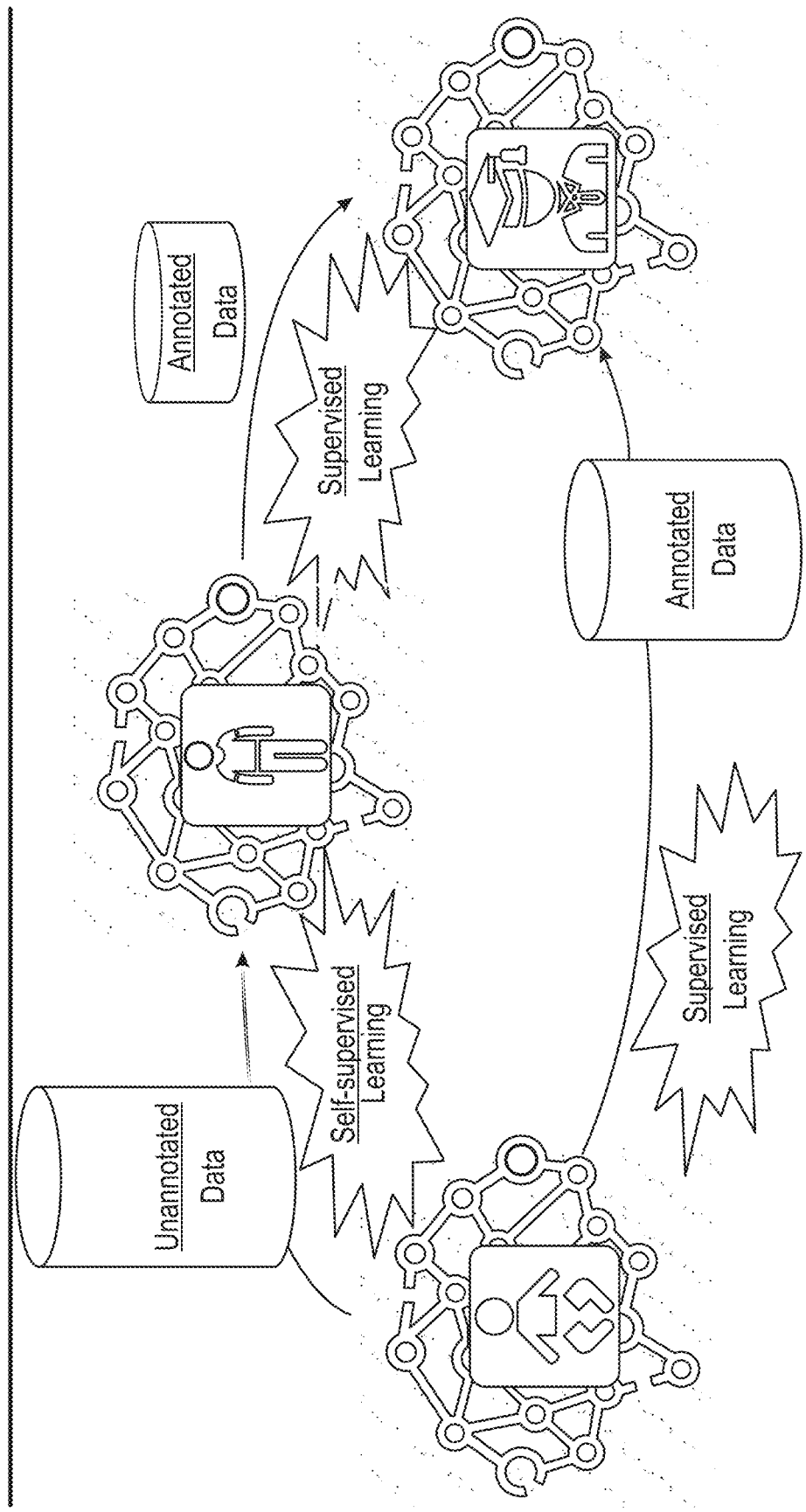

FIGS. 8A and 8B depict how the utilization of self-supervised learning improves upon prior known techniques, such as "supervised learning."

Many successful studies in medical imaging analysis are based on supervised learning, which requires a large number of labeled data, such as that which is depicted at FIG. 8A. As depicted at FIG. 8B, self-supervised learning is a very promising direction to address the challenge of limited annotation. For instance, as shown here, self-supervised learning aims to utilize a large number of un-annotated data to learn some general semantic features. Then, the general semantic features are used as initialization in supervised learning for target tasks.

Figure 8C:
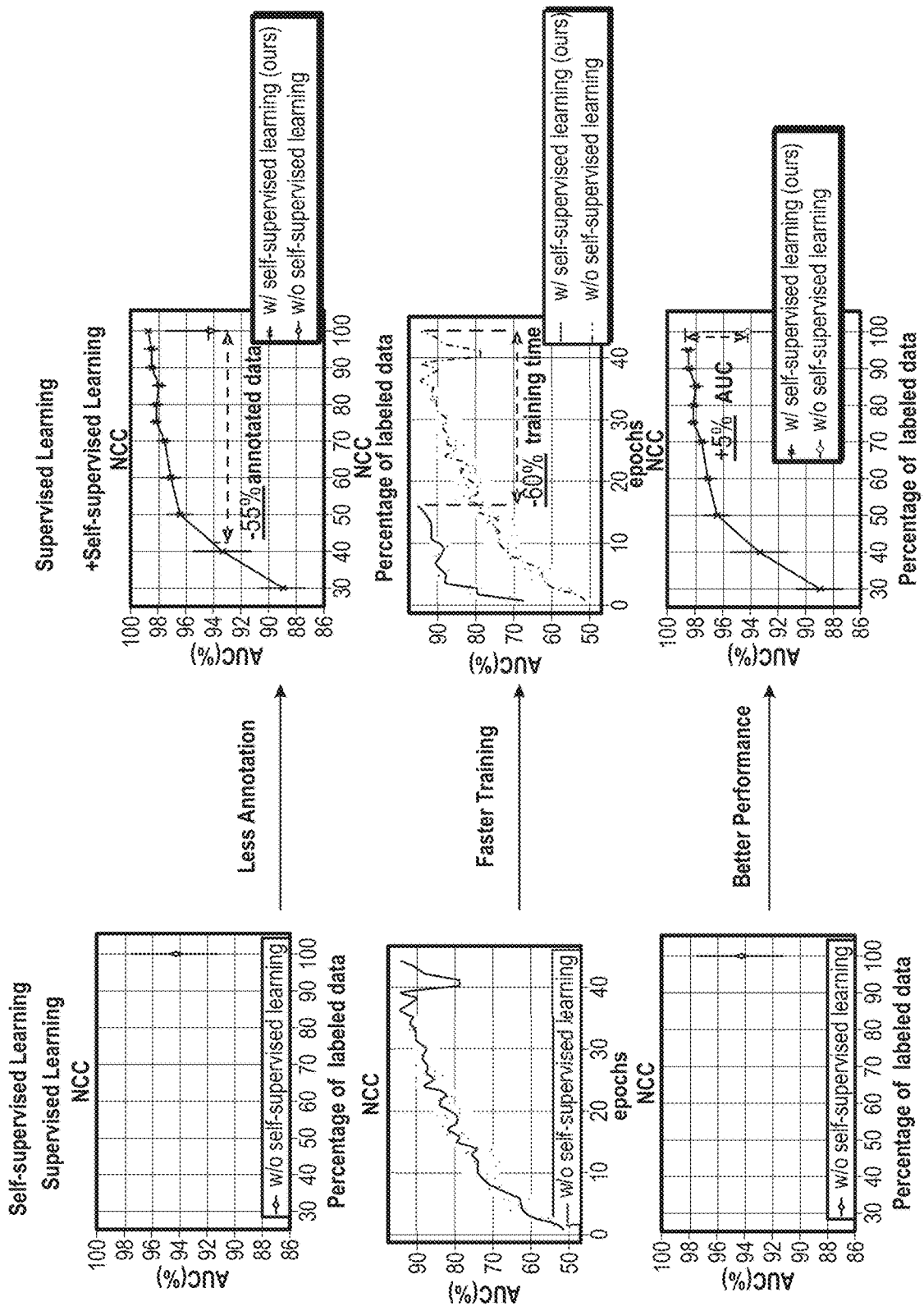
FIG. 8C depicts how the utilization of self-supervised learning over supervised learning methodologies provides for less annotation, faster training, and overall better performance.

FIG. 8C depicts how the utilization of self-supervised learning over supervised learning methodologies provides for less annotation, faster training, and overall better performance.

Compared with supervised learning, three benefits are expected by introducing self-supervised learning in the manner depicted above at FIGS. 8A and 8B.

First, less annotated data is required to be utilized to achieve equivalent or better target task performance, which saves significant resources, including time and money. Second, the models require less time for training. And third, even with the same amount of data, the models achieve better performance in target tasks, as is depicted at FIG. 8C.

Figure 9A:
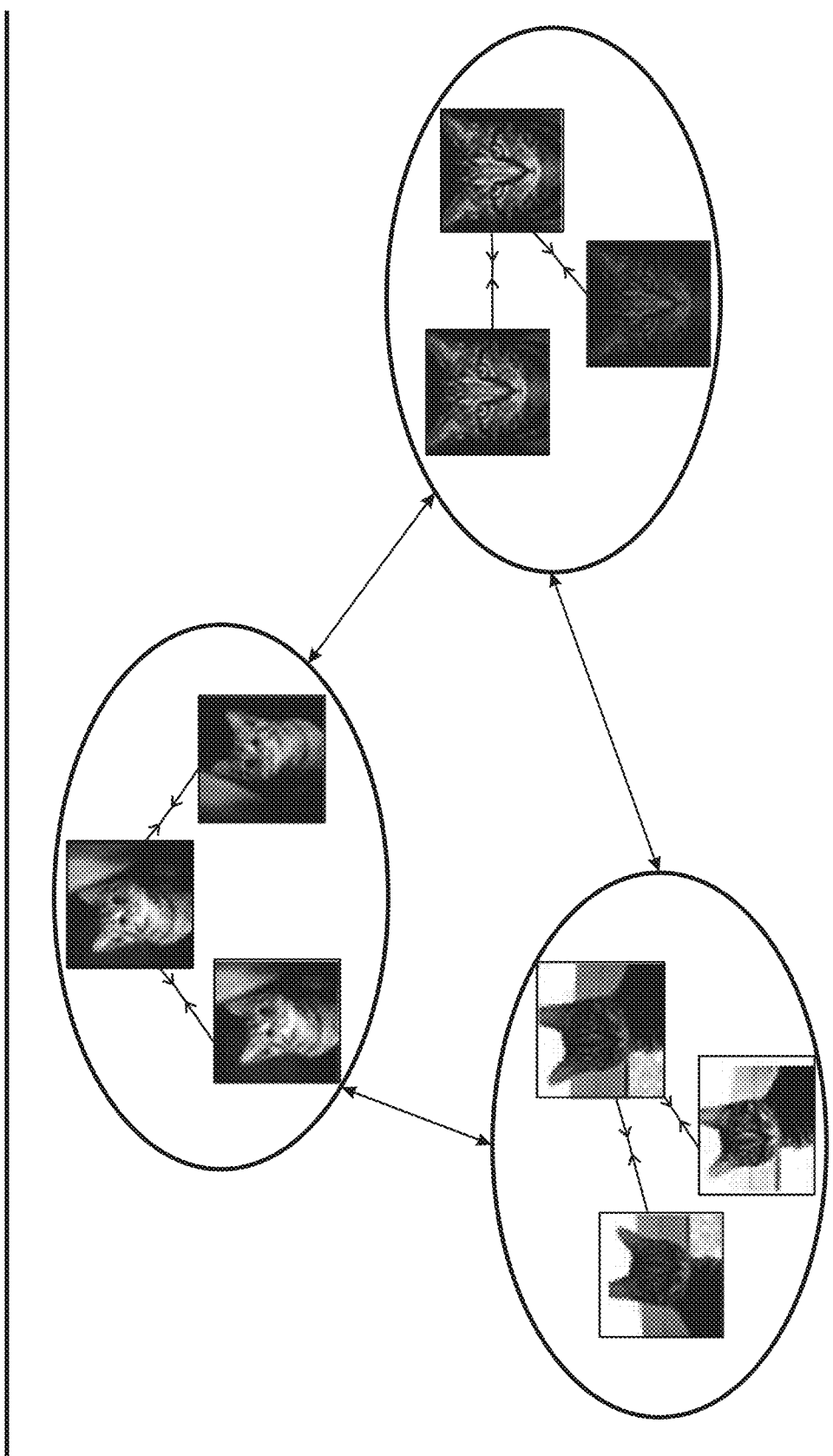
FIGS. 9A and 9B depict an exemplary implementation of contrastive learning, in accordance with described embodiments.
Figure 9B:
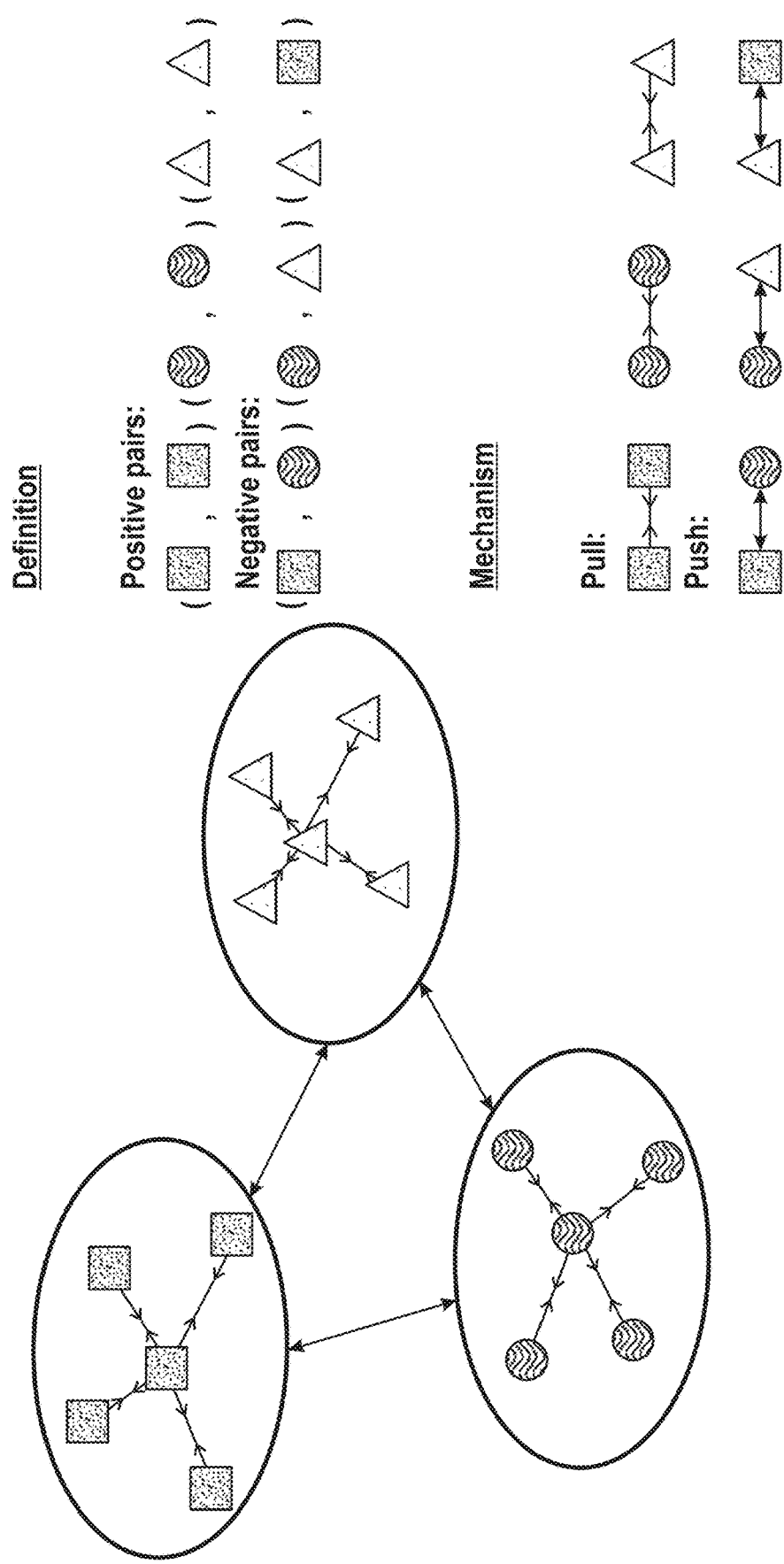

FIGS. 9A and 9B depict an exemplary implementation of contrastive learning, in accordance with described embodiments.

A general overview of contrastive learning is depicted at FIG. 9A. Assuming the model has access to the unlabeled images depicted here, through the use of contrastive learning, through initial processing, we can first generate various augmented images from the original image. Then, through additional processing, we pull all augmented images generated from the same original image as close as possible. Meanwhile, we also push augmented images generated from different original images as far as possible, resulting in the variations shown.

With use of contrastive learning, there are two key components, as are depicted at FIG. 9B. First, we define positive and negative pairs. For example, we can define two augmented images from the same cat (as depicted at FIG. 9A) as a positive pair (illustrated at FIG. 9B with the same shape), while two different cat images are defined as a negative pair (illustrated at FIG. 9B with different shapes). Second, further processing is then used to pull positive-pair features together, and at the same time, push negative-pair features farther away.

FIGS. 10A, 10B, 10C, and 10D depict an exemplary implementation and additional detail of the Parts2Whole methodology, in accordance with described embodiments.

Figure 10A:
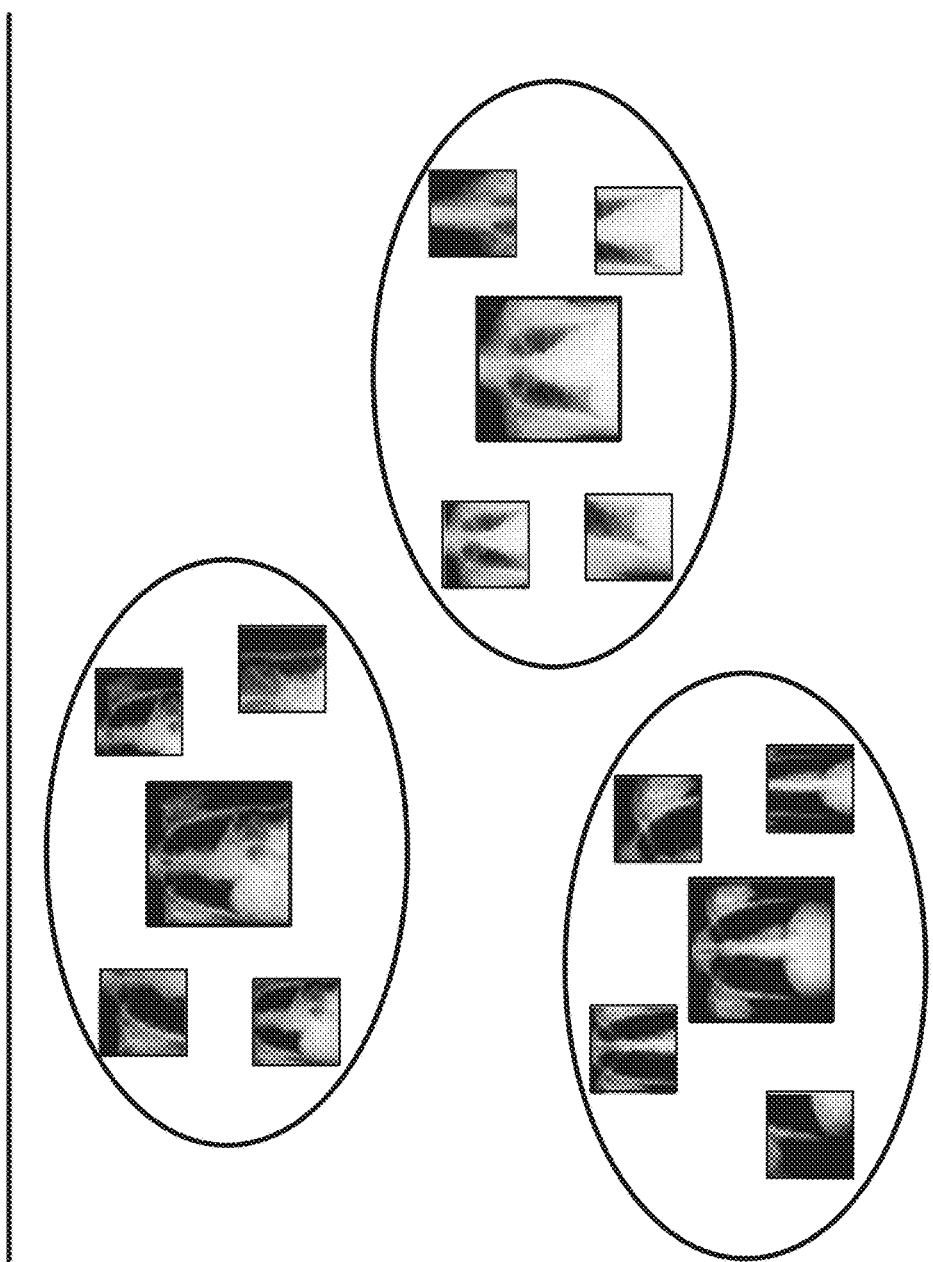

Based on the basic idea of contrastive learning as depicted above, it is then possible to expand upon these principals to propose a new self-supervised learning method, referred to as Parts2Whole, such as that which is described herein and which is generally depicted at FIG. 10A. First, through the use of the Parts2Whole framework, we explore the universal and intrinsic part-whole relationship to define positive and negative pairs.

To be specific, we treat each image in the dataset as a whole image; then, we define all parts belonging to the same whole image as positive pairs (illustrated in the same circle at FIG. 10A), while parts belonging to different whole images are negative pairs (illustrated in different circles).

Figure 10B:
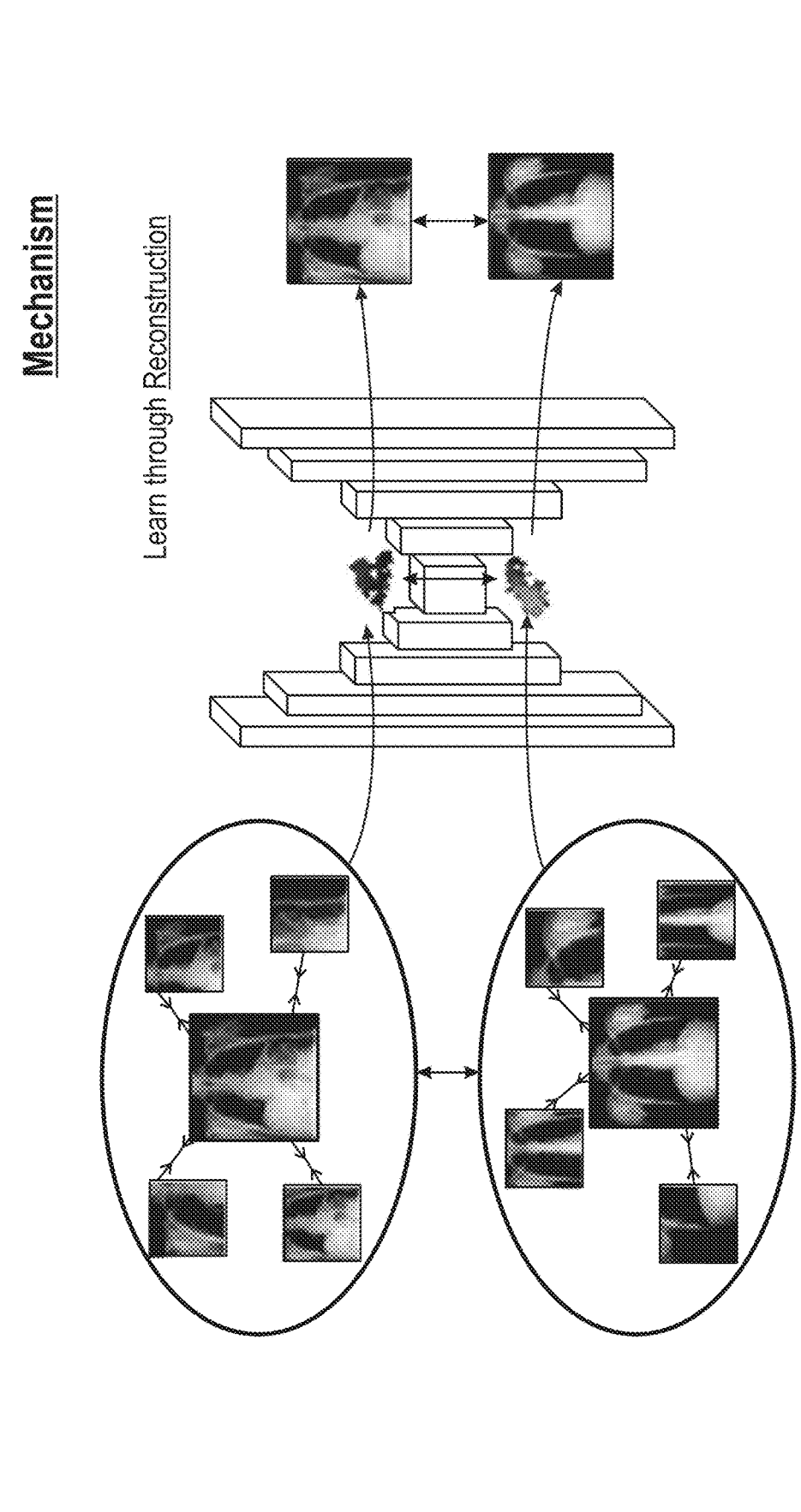

With reference to FIG. 10B, a reconstruction framework is depicted here via which to learn contrastive features. That is, by reconstructing parts that belong to the same whole image to the same ground truth, the positive-pair features are pulled together. Meanwhile, the negative-pair features are pushed away by reconstructing parts belonging to different whole images to different ground truths.

With reference to FIG. 10C, given an unlabeled whole image, processing first randomly crops and resizes the unlabeled whole image to generate various parts. Then, processing feeds the part to an encoder-decoder architecture, as shown here, without any skip connections and trains the network to reconstruct the original whole image.

Figure 10D:
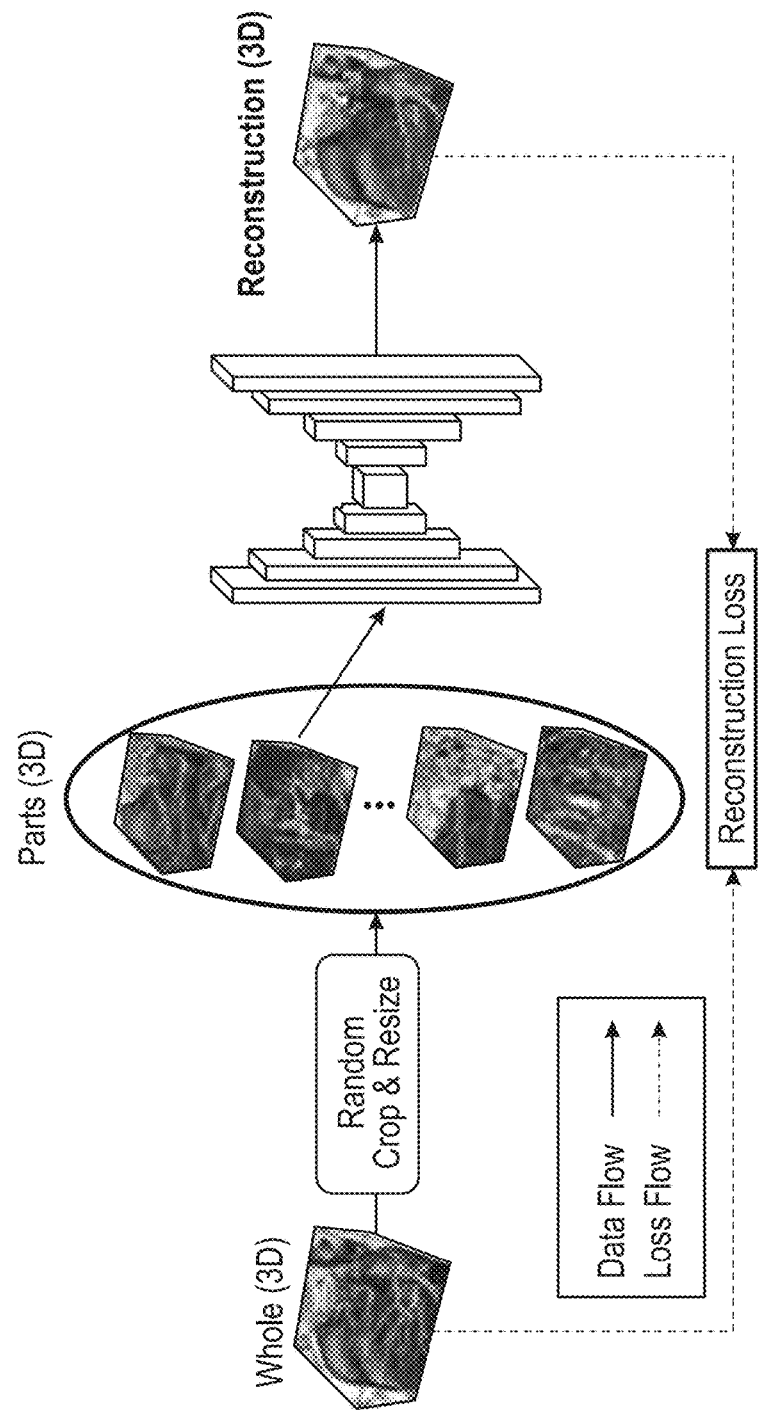

Furthermore, as depicted at FIG. 10D, the proposed 2D framework in FIG. 10C is readily extendable to 3D medical images as well as the 2D medical images.

Figure 11A:
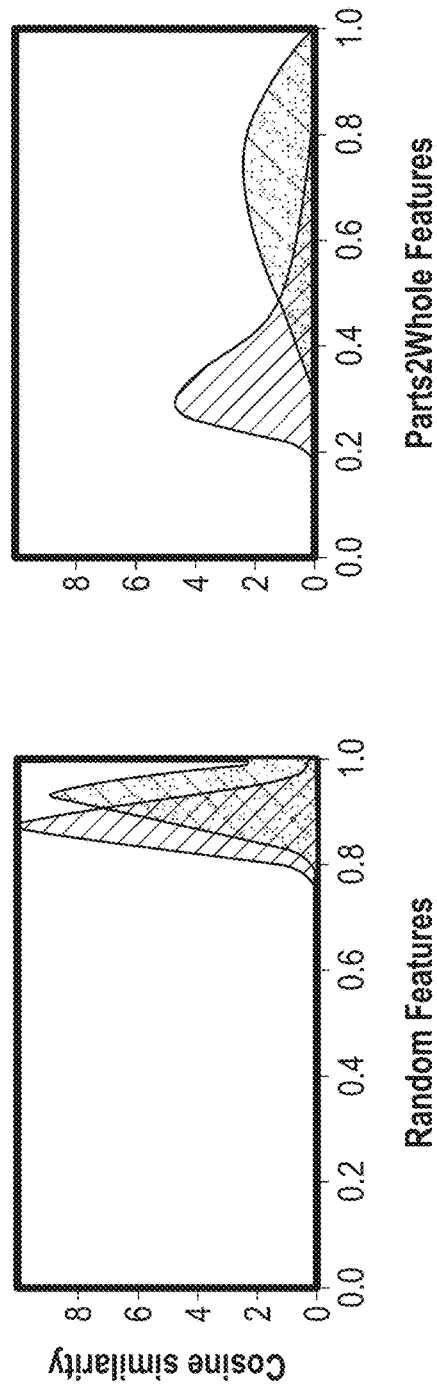

FIGS. 11A, 11B, and 11C depict additional supporting experimental detail for the Parts2Whole methodology, specifically demonstrating significantly better or competitive results, in accordance with described embodiments.

As depicted at FIG. 11A, the proposed Parts2Whole framework learns contrastive representations embedded with part-whole semantics by reconstructing the whole image from its parts. For instance, we measure the cosine similarity of features among positive and negative pairs. As shown at FIG. 11A, the two distributions are highly overlapped for random features. However, after trained with our Parts2Whole, the similarity of positive pairs is closer to 1, which means they are pulled together, while the similarity of negative pairs is closer to 0, which means they are pushed farther away.

Now, we know Parts2Whole can learn contrastive features. Next, we would like to see its transferability to target tasks.

With reference to FIG. 11B, the Parts2Whole framework is comprehensively evaluated, by comparing it with four publicly available 3D models pre-trained on either natural videos or 3D medical images, in both a supervised and a self-supervised fashion.

As shown at FIG. 11C, we also consider five target tasks, including two classifications (i.e., NCC and ECC) and three segmentation tasks (i.e., NCS, LCS, and BMS). Experimental results are summarized in this table showing that the described methodology outperforms other 3D pre-trained models on three tasks, including NCC, LCS, and BMS. Moreover, the described methodology also offers competitive performances in the other two tasks (e.g., NCS and ECC).

Figure 12:
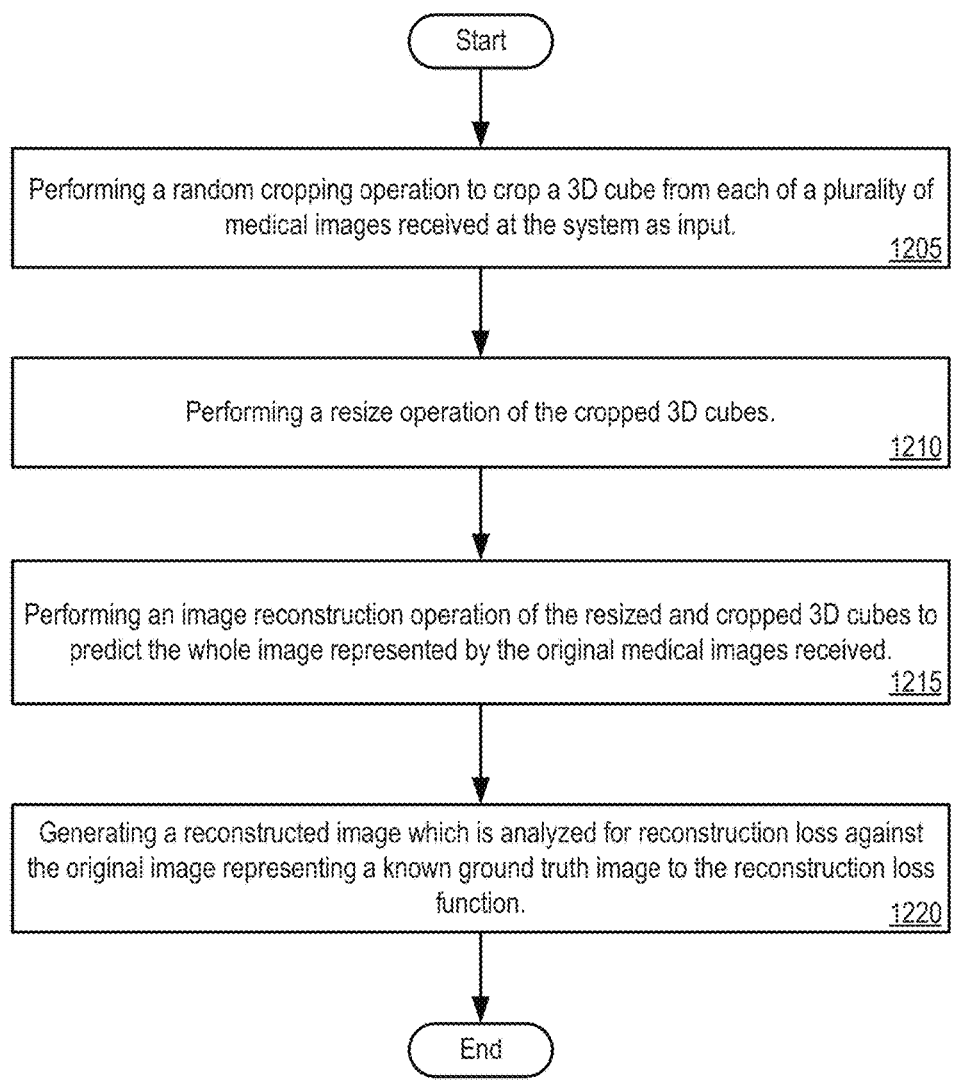
FIG. 12 depicts a flow diagram illustrating a method for training a deep model to learn contrastive representations embedded within part-whole semantics via a self-supervised learning framework, in which the trained deep models are then utilized for the processing of medical imaging, in accordance with disclosed embodiments.

FIG. 12 depicts a flow diagram illustrating a method 1200 for training a deep model to learn contrastive representations embedded within part-whole semantics via a self-supervised learning framework, in which the trained deep models are then utilized for the processing of medical imaging, in accordance with disclosed embodiments. Method 1200 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 1301 (see FIG. 13) and the machine 1401 (see FIG. 14) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1200 depicted at FIG. 12, there is a method performed by a system specially configured for the training a deep model to learn contrastive representations embedded within part-whole semantics via a self-supervised learning framework in the absence of manual labeling of 3D medical imagery.

Such a system may be configured with at least a processor and a memory to execute specialized instructions which cause the system to perform the following operations:

At block 1205, processing logic performs a random cropping operation to crop a 3D cube from each of a plurality of medical images received at the system as input.

At block 1210, processing logic performs a resize operation of the cropped 3D cubes.

At block 1215, processing logic performs an image reconstruction operation of the resized and cropped 3D cubes to predict the whole image represented by the original medical images received.

At block 1220, processing logic generates a reconstructed image which is analyzed for reconstruction loss against the original image representing a known ground truth image to the reconstruction loss function.

According to another embodiment of method 1200, randomly cropping the 3D cube comprises cropping the 3D cube utilizing random scales and random aspect ratios.

According to another embodiment of method 1200, the random scales and random aspect ratios utilized for the random cropping erase low-level cues across different parts but maintain informative structures and textures amongst the randomly cropped 3D cubes.

According to another embodiment of method 1200, resizing the cropped 3D cubes comprises resizing the cropped 3D cubes to produce transformed part for later reconstruction.

According to another embodiment of method 1200, the reconstruction is to predict the whole image from a local patch by training an encoder-decoder pair to minimize the loss function between the transformed part produced via the random cropping and resizing and the original whole image.

According to another embodiment of method 1200, the encoder learns contrastive representations that embed the part-whole semantics.

According to another embodiment of method 1200, all skip connections connecting the encoder and decoder are removed from a U-Net architecture.

According to another embodiment of method 1200, the skip connections remain absent during training so as to force the bottleneck representations encoding high-level information.

According to another embodiment of method 1200, a part size via which to resize the cropped 3D cube is configurable to avoid training an auto-encoder without learning semantics when the part size is too large and to avoid an unsolvable task when the part size is too small so as to lack sufficient information.

According to a particular embodiment, there is a non-transitory computer-readable storage medium having instructions stored thereupon that, when executed by a system having at least a processor and a memory therein, the instructions cause the system to perform operations including: performing a random cropping operation to crop a 3D cube from each of a plurality of medical images received at the system as input; performing a resize operation of the cropped 3D cubes; performing an image reconstruction operation of the resized and cropped 3D cubes to predict the whole image represented by the original medical images received; and generating a reconstructed image which is analyzed for reconstruction loss against the original image representing a known ground truth image to the reconstruction loss function.

Figure 13:
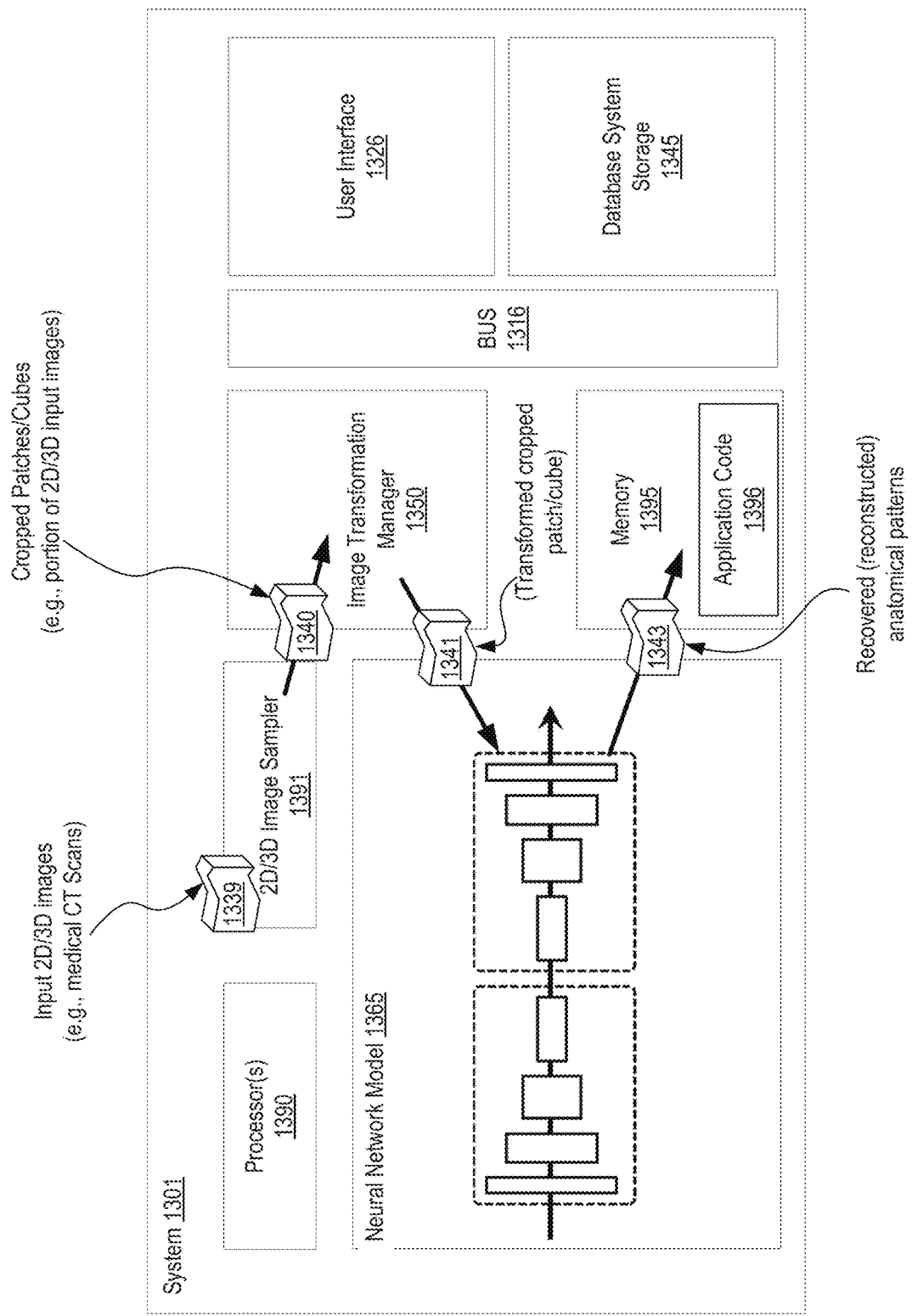
FIG. 13 shows a diagrammatic representation of a system within which embodiments may operate, be installed, integrated, or configured, in accordance with one embodiment.

FIG. 13 shows a diagrammatic representation of a system 1301 within which embodiments may operate, be installed, integrated, or configured. In accordance with one embodiment, there is a system 1301 having at least a processor 1390 and a memory 1395 therein to execute implementing application code 1396. Such a system 1301 may communicatively interface with and cooperatively execute with the benefit of remote systems, such as a user device sending instructions and data, a user device to receive as an output from the system 1301.

According to the depicted embodiment, the system 1301, includes the processor 1390 and the memory 1395 to execute instructions at the system 1301. The system 1301 as depicted here is specifically customized and configured specifically to train a deep model to learn contrastive representations embedded within part-whole semantics via a self-supervised learning framework in the absence of manual labeling of 3D medical imagery, in accordance with disclosed embodiments.

According to a particular embodiment, system 1301 is further configured to execute instructions via the processor for performing a random cropping operation to crop a 3D cube 1340 from each of a plurality of medical images received 1339 at the system as input. The cropping may be performed by the image transformation manager 1350. Such a system is further configured to execute instructions via the processor 1390 for performing a resize operation of the cropped 3D cubes, resulting in the transformed 1341 cropped (and now resized) patches or cubes from a 2D or 3D image respectively. The image resizing may also be performed by the image transformation manager 1350. The system is further configured to execute instructions via the processor 1390 for performing an image reconstruction operation of the resized and cropped 3D cubes to predict the whole image represented by the original medical images received. The system is further configured to generate a reconstructed image 1343 which is analyzed for reconstruction loss against the original image representing a known ground truth image to the reconstruction loss function.

The model output manager 1385 may further transmit output back to a user device or other requestor, for example, via the user interface 1326, or such information may alternatively be stored within the database system storage 1345 of the system 1301.

According to another embodiment of the system 1301, a user interface 1326 communicably interfaces with a user client device remote from the system and communicatively interfaces with the system via a public Internet.

Bus 1316 interfaces the various components of the system 1301 amongst each other, with any other peripheral(s) of the system 1301, and with external components such as external network elements, other machines, client devices, cloud computing services, etc. Communications may further include communicating with external devices via a network interface over a LAN, WAN, or the public Internet.

FIG. 14 illustrates a diagrammatic representation of a machine 1401 in the exemplary form of a computer system, in accordance one embodiment, within which a set of instructions, for causing the machine/computer system 1401 to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1401 includes a processor 1402, a main memory 1404 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1418 (e.g., a persistent storage device including hard disk drives and a persistent database and/or a multi-tenant database implementation), which communicate with each other via a bus 1430. Main memory 1404 includes an auto-encoder network 1424 (e.g., such as an encoder-decoder implemented via a neural network model but without skip connections) for performing self-learning operations on randomly cropped and resized samples as provided via the cropped sample transformation manager 1423, so as to train a deep model to learn contrastive representations embedded within part-whole semantics via a self-supervised learning framework in the absence of manual labeling of 3D medical imagery resulting in the trained model 1425 in support of the methodologies and techniques described herein. Main memory 1404 and its sub-elements are further operable in conjunction with processing logic 1426 and processor 1402 to perform the methodologies discussed herein.

Processor 1402 represents one or more specialized and specifically configured processing devices such as a microprocessor, central processing unit, or the like. More particularly, the processor 1402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1402 may also be one or more special-purpose processing devices such as an application-specific integrated circuit (ASIC), a field programmable gate array (FPGA), a digital signal processor (DSP), network processor, or the like. Processor 1402 is configured to execute the processing logic 1426 for performing the operations and functionality which is discussed herein.

The computer system 1401 may further include a network interface card 1408. The computer system 1401 also may include a user interface 1410 (such as a video display unit, a liquid crystal display, etc.), an alphanumeric input device 1412 (e.g., a keyboard), a cursor control device 1413 (e.g., a mouse), and a signal generation device 1416 (e.g., an integrated speaker). The computer system 1401 may further include peripheral device 1436 (e.g., wireless or wired communication devices, memory devices, storage devices, audio processing devices, video processing devices, etc.).

The secondary memory 1418 may include a non-transitory machine-readable storage medium or a non-transitory computer readable storage medium or a non-transitory machine-accessible storage medium 1431 on which is stored one or more sets of instructions (e.g., software 1422) embodying any one or more of the methodologies or functions described herein. The software 1422 may also reside, completely or at least partially, within the main memory 1404 and/or within the processor 1402 during execution thereof by the computer system 1401, the main memory 1404 and the processor 1402 also constituting machine-readable storage media. The software 1422 may further be transmitted or received over a network 1420 via the network interface card 1408.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
  a memory to store instructions;
  a processor to execute the instructions stored in the memory;
  wherein the system is specially configured to execute the instructions via the processor to:
  receive at the system as input a plurality of whole three-dimensional (3D) medical images;
  for each of the plurality of whole 3D medical images:
    randomly crop each of a plurality of 3D parts from the whole 3D medical image received at the system as input;
    resize each of the plurality of randomly cropped 3D parts;
    predict, based on each of the randomly cropped and resized plurality of 3D parts, the whole 3D medical image;
    reconstruct the whole 3D medical image from the predicted whole 3D medical image;
    measure a reconstruction loss, according to a reconstruction loss function, in the reconstructed whole 3D medical image compared to the whole 3D medical image; and
    analyze the reconstruction loss against the whole 3D medical image representing a known ground truth image to the reconstruction loss function.

2. The system of claim 1, wherein to randomly crop each of the plurality of 3D parts from the whole 3D medical image comprises to randomly crop, using random scales and random aspect ratios, each of the plurality of 3D parts from the whole 3D medical image.

3. The system of claim 2, wherein the random scales and random aspect ratios erase low-level cues across, but maintain informative structures and textures amongst, different ones of the randomly cropped plurality of 3D parts.

4. The system of claim 1, wherein to resize each of the plurality of randomly cropped 3D parts comprises to resize each of the plurality of randomly cropped 3D parts to produce transformed 3D parts; and
  wherein to predict, based on each of the randomly cropped and resized plurality of 3D parts, the whole 3D medical image, comprises to predict, based on each of the transformed 3D parts, the whole 3D medical image.

5. The system of claim 4, wherein to predict, based on each of the transformed 3D parts, the whole 3D medical image comprises to train an encoder-decoder pair to minimize the reconstruction loss, measured according to the reconstruction loss function, between each of the transformed 3D parts and the whole 3D medical image.

6. The system of claim 1, further comprising a Convolutional Neural Network (CNN) including:
  a decoder to output the reconstructed whole 3D medical images; and
  an encoder coupled to the decoder to learn contrastive representations that embed part-whole semantics based on the reconstructed whole 3D medical images.

7. The system of claim 6, wherein the CNN comprises a U-Net architecture; and
  the coupling between the encoder and the decoder excludes a skip connection between the encoder and decoder in the U-Net architecture.

8. The system of claim 7, wherein the skip connection excluded between the encoder and the decoder in the U-Net architecture comprises the skip connection excluded between the encoder and the decoder in the U-Net architecture during training of the CNN to learn the contrastive representations, to force a plurality of bottleneck representations that encode high-level information in the randomly cropped plurality of 3D parts.

9. The system of claim 1, wherein to resize each of the plurality of randomly cropped 3D parts comprises to resize each of the plurality of randomly cropped 3D parts according to a configurable part size to avoid training an autoencoder without learning semantics when the part size is too large and to avoid an unsolvable task when the part size is too small so as to lack sufficient information.

10. A method performed by a system having at least a processor and a memory therein to execute instructions, wherein the method comprises:
  receiving at the system as input a plurality of whole three-dimensional (3D) medical images;
  for each of the plurality of whole 3D medical images:
    randomly cropping, using random scales and random aspect ratios, each of a plurality of 3D parts from the whole 3D medical image received at the system as input;

resizing each of the plurality of randomly cropped 3D parts;

predicting, based on each of the randomly cropped and resized plurality of 3D parts, the whole 3D medical image;

reconstructing the whole 3D medical image from the predicted whole 3D medical image;

measuring a reconstruction loss, according to a reconstruction loss function, in the reconstructed whole 3D medical image compared to the whole 3D medical image; and analyzing the reconstruction loss against the whole 3D medical image representing a known ground truth image to the reconstruction loss function.

11. The method of claim 10, wherein randomly cropping each of the plurality of 3D parts from the whole 3D medical image comprises randomly cropping, using random scales and random aspect ratios, each of the plurality of 3D parts from the whole 3D medical image.

12. The method of claim 11, wherein the random scales and random aspect ratios erase low-level cues across, but maintain informative structures and textures amongst, different ones of the randomly cropped plurality of 3D parts.

13. The method of claim 10, wherein resizing each of the plurality of randomly cropped 3D parts comprises resizing each of the plurality of randomly cropped 3D parts to produce transformed 3D parts; and wherein to predict, based on each of the randomly cropped and resized plurality of 3D parts, the whole 3D medical image, comprises to predict, based on each of the transformed 3D parts, the whole 3D medical image.

14. The method of claim 13, wherein predicting, based on each of the transformed 3D parts, the whole 3D medical image comprises training an encoder-decoder pair to minimize the reconstruction loss, measured according to the reconstruction loss function between each of the transformed 3D parts and the whole 3D medical image.

15. The method of claim 10, further comprising a decoder of a Convolutional Neural Network (CNN) providing as output the reconstructed whole 3D medical images; and an encoder coupled to the decoder learning contrastive representations that embed part-whole semantics based on the reconstructed whole 3D medical images.

16. The method of claim 15, wherein the CNN comprises a U-Net architecture; and the coupling between the encoder and the decoder excluding a skip connection between the encoder and the decoder in the U-Net architecture.

17. The method of claim 16, wherein the skip connection excluded between the encoder and the decoder in the U-Net architecture comprises the skip connection excluded between the encoder and the decoder in the U-Net architecture during training of the CNN to learn the contrastive representations, to force a plurality of bottleneck representations encoding high-level information in the randomly cropped plurality of 3D parts.

18. The method of claim 10, wherein resizing each of the plurality of randomly cropped 3D parts comprises resizing each of the plurality of randomly cropped parts according to a configurable part size to avoid training an auto-encoder without learning semantics when the part size is too large and to avoid an unsolvable task when the part size is too small so as to lack sufficient information.

19. A non-transitory computer-readable storage media having instructions stored thereupon that, when executed by a system having at least a processor and a memory therein, cause the system to:

receive at the system as input a plurality of whole three-dimensional (3D) medical images;

randomly crop, using random scales and random aspect ratios, each of a plurality of 3D parts from the whole 3D medical image received at the system as input;

resize each of the plurality of randomly cropped 3D parts;

predict, based on each of the randomly cropped and resized plurality of 3D parts, the whole 3D medical image;

reconstruct the whole 3D medical image from the predicted whole 3D medical image;

measure a reconstruction loss, according to a reconstruction loss function, in the reconstructed whole 3D medical image compared to the whole 3D medical image; and analyze the reconstruction loss against the whole 3D medical image representing a known ground truth image to the reconstruction loss function.

20. The non-transitory computer-readable storage media of claim 19, wherein the random scales and random aspect ratios erase low-level cues across, but maintain informative structures and textures amongst, different ones of the randomly cropped plurality of 3D parts.

* * * * *